United States Patent [19]

Mihara

[11] Patent Number: 4,582,399

[45] Date of Patent: Apr. 15, 1986

[54] ZOOM LENS SYSTEM

[75] Inventor: Shin-ichi Mihara, Tokyo, Japan

[73] Assignee: Olympus Optical Co., Ltd., Tokyo, Japan

[21] Appl. No.: 525,823

[22] Filed: Aug. 23, 1983

[30] Foreign Application Priority Data

Aug. 27, 1982 [JP] Japan .................. 57-147783

[51] Int. Cl.[4] .................. G02B 15/18
[52] U.S. Cl. .................. 350/427; 350/423
[58] Field of Search .................. 350/427, 423

[56] References Cited

U.S. PATENT DOCUMENTS 4,094,586 6/1978 Sato et al. .................. 350/427
4,504,125 3/1985 Fujii .................. 350/423

FOREIGN PATENT DOCUMENTS 53-131852 11/1978 Japan .
56-119110 9/1981 Japan .
56-126819 10/1981 Japan .
56-150717 11/1981 Japan .

Primary Examiner—John K. Corbin
Assistant Examiner—Paul Dzierzynski
Attorney, Agent, or Firm—Cushman, Darby & Cushman

[57] ABSTRACT

A zoom lens system comprising a first, second, third and fourth lens groups, the first lens group being a focusing lens group having a positive focal length, the second lens group being a variator having a negative focal length, the third lens group being a compensator having a positive focal length, the fourth lens group being a relay lens comprising a positive, negative, positive and negative lenses, the zoom lens system being arranged to make the overall length of the zoom lens system short by making the overall length of the relay lens short and, at the same time, to have excellent performance.

8 Claims, 21 Drawing Figures

ZOOM LENS SYSTEM

BACKGROUND OF THE INVENTION (a) Field of the Invention

The present invention relates to a zoom lens system and, more particularly, to a zoom lens system with the focal length of 75 mm to 150 mm, large aperture ratio (F/3.5), high performance, small number of lenses constituting the lens system, and short overall length.

(b) Description of the Prior Art

To make the aperture ratio of the above-mentioned kind of zoom lens system large to about F/3.5 and to make the overall length of the lens system short, it is known that it is necessary to sacrifice the quality of image or to make thicknesses of respective lens elements constituting the varifocal system in the marginal portion and those on the optical axis as thin as possible in order to ensure sufficient spaces for moving the varifocal lens groups.

To manufacture such lenses that thicknesses in the marginal portion and those on the optical axis are thin, it is difficult to adopt high-speed grinding and polishing enabling to reduce the cost of production and, in case of a cemented lens component, strain occurs in the lens component. Therefore, even when a lens system with high performance is designed, the performance of the actually manufactured lens system does not become so favourable. To manufacture a lens system with performance close to that of the designed lens system, accuracy of parts should be made high. As a result, the cost of production becomes high, and this is not preferable.

This kind of known telephoto zoom lens systems are disclosed in Japanese published unexamined patent applications Nos. 131852/78 and 119110/81.

Besides, Japanese published unexamined patent application No. 126819/81 also discloses this kind of zoom lens system.

However, in case of the zoom lens system disclosed in Japanese published unexamined patent application No. 126819/81, the aperture ratio is F/4.5 and this is smaller compared with the lens system according to the present invention.

Japanese published unexamined patent application No. 150717/81 also discloses this kind of zoom lens system. However, in case of said zoom lens system, the type of the afocal system is different from that of the zoom lens system according to the present invention and the lens configuration of the lens system is also different. The zoom lens system disclosed in said Japanese published unexamined patent application has such lens configuration that it is rather difficult to correct spherical aberration and astigmatiam and, especially, astigmatism thereof in the marginal portion of field is not corrected so favourably.

SUMMARY OF THE INVENTION

It is, therefore, a primary object of the present invention to provide a zoom lens system with a small number of lens elements constituting the lens system in which moving spaces for varifocal lens groups are ensured sufficiently so that variation of aberrations at the time of zooming will not become large in spite of the fact that thichnesses of respective lens elements in the marginal portion and those on the optical axis are sufficiently large, the zoom lens system being arranged to have a short overall length thereof by making the overall length of the relay lens short and to have high performance.

The zoom lens system according to the present invention comprises, as shown in FIG. 1, a first lens group I, a second lens group II, a third lens group III and a fourth lens group IV in the order from the object side, the first lens group I being a focusing lens group having positive refractive power, the second lens group II being a variator having nagative refractive power, the third lens group III being a compensator having positive refractive power, the fourth lens group IV being a relay lens having positive refractive power, the zoom lens system being arranged to move the second lens group II along the optical axis for the purpose of zooming and, at the same time, to move the third lens group III along the optical axis in order to compensate for deviation of image position to be caused at the time of zooming.

Besides, the zoom lens system according to the present invention is arranged, in order to attain the above-mentioned object of the present invention, that the fourth lens group IV which is the relay lens has four-component four-element lens configuration with a positive single lens, a negative single lens, a positive single lens located by leaving a comparatively large airspace in respect to the above-mentioned negative single lens, and a negative single lens in the order from the object side. By arranging the final lens as a negative lens as explained in the above, the zoom lens system according to the present invention is arranged that the principal point of the fourth lens group IV as a whole comes to a position in front of the positive lens located on the object side in the fourth lens group IV and, moreover, the ratio of the focal length of the fourth lens group IV to the focal length of the lens system as a whole is made as small as possible.

Furthermore, the zoom lens system according to the present invention is arranged to fulfill the following conditions:

$$0.8 < \phi_{9,10}/\phi_R < 1.6 \quad (1)$$

$$1.0 < |\phi_{12}|/\phi_R < 2.5 \quad (2)$$

$$1.3 < \phi_R/\phi < 2.2 \quad (3)$$

where, reference symbol $\phi_{9,10}$ represents the total refractive power of the positive lens and negative lens located on the object side in the fourth lens group IV, reference symbol $\phi_{12}$ represents the refractive power of the negative lens located on the image side in the fourth lens group IV, reference symbol $\phi_R$ represents the refractive power of the fourth lens group IV, and reference symbol $\phi$ represents the refractive power of the zoom lens system as a whole in the teleposition.

Contents of respective conditions shown in the above are described below.

The condition (1) difines the ratio between the refractive power $\phi_R$ of the relay lens (the fourth lens group IV) as a whole and the refractive power $\phi_{9,10}$ of the front subgroup in the relay lens, i.e., the fourth lens group IV (the front subgroup means the positive lens and negative lens located on the object side in the fourth lens group IV). When the value defined by the condition (1) becomes larger than the upper limit thereof, it is convenient for making the overall length of the relay lens short. However, spherical aberration of higher order tends to occur and the performance of the lens system becomes unfavourable. If the value defined by the condition (1) becomes smaller than the lower limit thereof, it is impossible to make the overall length of the relay lens short.

The condition (2) defines the refractive power $\phi_{12}$ of the negative lens (the fourth nagative lens) located on the image side in the fourth lens group IV. When the value defined by the condition (2) becomes larger than the upper limit thereof, it is advantageous for making the overall length of the zoom lens system as a whole short. However, pincushion distortion becomes large in the teleposition, and this is not desirable. If the value defined by the condition (2) becomes smaller than the lower limit thereof, it is impossible to make the overall length of the zoom lens system as a whole short.

The condition (3) defines the ratio of the refractive power $\phi_R$ of the fourth lens group IV to the refractive power $\phi$ of the zoom lens system as a whole in the teleposition. If the value defined by the condition (3) becomes larger than the upper limit thereof, the fourth lens group IV tends to become long and, moreover, positive distortion in the teleposition tends to become large. When the value defined by the condition (3) becomes smaller than the lower limit thereof, the fourth lens group IV becomes small and distortion in the teleposition becomes small. However, the amount of movement of the third lens group III (compensator) becomes too large. As a result, variation of aberrations at the time of variation of magnification becomes large, and this is not desirable.

The zoom lens system described so far enables to attain the object of the present invention. When, however, it is so arranged to further fulfill the conditions (4) through (7) shown below, it is possible to reduce offaxial aberrations such as astigmatism, coma, distortion, etc. and chromatic aberration of spherical aberration and, therefore, it is possible to further improve the contrast of image:

$$0.15 < d_{18} \cdot \phi_R < 0.35 \quad (4)$$

$$0.03 < d_{20} \cdot \phi_R < 0.10 \quad (5)$$

$$0.25 < n_{10} - n_9 < 0.45 \quad (6)$$

$$25 < \nu_9 - \nu_{10} < 40 \quad (7)$$

where, reference symbol $d_{18}$ represents the airspace between the second negative lens (negative lens on the object side) and the third positive lens (positive lens on the image side) in the fourth lens group IV, reference symbol $d_{20}$ represents the airspace between the third positive lens and the fourth negative lens (negative lens on the image side) in the fourth lens group IV, reference symbols $n_9$ and $n_{10}$ respectively represent refractive indices of the first positive lens and the second negative lens in the fourth lens group IV, and reference symbols $\nu_9$ and $\nu_{10}$ respectively represent Abbe's numbers of the first positive lens and the second negative lens in the fourth lens group IV.

Out of respective conditions shown in the above, the condition (4) defines the airspace between the front subgroup and the rear subgroup in the fourth lens group IV. If the value defined by the condition (4) becomes larger than the upper limit thereof, pincushion distortion tends to increase in the teleposition. If the value defined by the condition (4) becomes smaller than the lower limit thereof, refractive powers of respective lens components constituting the fourth lens group IV increase and, as a result spherical aberration will be undercorrected or meridional curvature of image of higher order and coma will tend to occur.

When the value defined by the condition (5) becomes larger than the upper limit thereof, it is convenient for making the overall length of the fourth lens group IV short. However, it becomes difficult to fabourably correct offaxial aberrations and distortion. If the value defined by the condition (5) becomes smaller than the lower limit thereof, the overall length of the fourth lens group IV becomes long and, consequently, the negative lens arranged on the image side in the fourth lens group IV loses its meaning.

The condition (6) defines the difference between the refractive indices of the two lens components (the first positive lens and the second negative lens) constituting the front subgroup in the fourth lens group IV. If the value defined by the condition (6) becomes larger than the upper limit thereof, the overall length of the zoom lens system as a whole becomes long. If the value defined by the condition (6) becomes smaller than the lower limit thereof, it becomes difficult to correct aberrations, especially, coma and Petzval's sum.

The condition (7) defines the difference between Abbe's numbers of the first positive lens and the second negative lens in the fourth lens group IV. When the value defined by the condition (7) becomes larger than the upper limit thereof, it is advantageous for correction of longitudinal chromatic aberration. However, even when spherical aberration of d-line can be corrected satisfactorily favourably, spherical aberrations of rays with short wavelengths, g-line for example, in the marginal portion will be considerably overcorrected in the wide position and, as a result, the contrast of image tends to become unfavourable. When the value defined by the condition (7) becomes smaller than the lower limit thereof, spherical aberrations of rays with respective wavelengths will be well balanced, and it is possible to obtain an image with high contrast. However, longitudinal chromatic aberration will be undercorrected and, as a result, the quality of image cannot be improved even when the sotp is stopped down.

As described so far, the zoom lens system according to the present invention is arranged to make the overall length of the relay lens (the fourth lens group IV) short in order to make the overall length of the zoom lens short and, at the same time, to ensure sufficient moving spaces for the varifocal lens groups by ensuring sufficient thicknesses of respective lens elements in the marginal portion and on the optical axis. For this purpose, refractive powers of respective lens elements in the fourth lens group IV are distributed so as to fulfill the conditions (1) through (3). Besides, the zoom lens system according to the present invention is arranged to further fulfill the conditons (4) through (7) so that spherical aberration, coma, astigmatism, Petzval's sum, distortion and chromatic aberration are corrected favourably even when the overall length of the fourth lens group IV is made short.

To make the overall length of the zoom lens system short, to make the aperture ratio large, i.e., F/3.5, to make the varifocal ratio 2 and to attain extremely high performance as a zoom lens system of this class, it is essential to make variation of aberrations extremely amall over the whole range of focal length. For this purpose, it is preferable to arrange that the first lens group I comprises a positive cemented doublet, which consists of a positive lens and a negative lens, and a positive single lens in the order from the object side, the second lens group II comprises a negative cemented doublet, which consists of a positive lens and a negative lens, and a negative single lens in the order from the object side, and the third lens group III comprises a cemented doublet consisting of a positive lens and a negative lens.

Besices, it is preferable to arrange that the zoom lens system further fulfills the conditions (8) through (11) shown below:

$$0.54 < r_1 \cdot \phi < 0.90 \qquad (8)$$

$$0.05 < n_2 - n_1 < 0.25 \qquad (9)$$

$$1.45 < n_3 < 1.60 \qquad (10)$$

$$0.2 < n_4 - n_5 < 0.45 \qquad (11)$$

where, reference symbol $r_1$ represents the radius of curvature of the surface on the object side of the positive cemented doublet constituting the first lens group I, reference symbols $n_1$ and $n_2$ respectively represent refractive indices of the two lens elements constituting the above-mentioned cemented doublet, reference symbol $n_3$ represents the refractive index of the positive single lens constituting the first lens group I, and reference symbols $n_4$ and $n_5$ respectively represent refractive indices of the two lens elements constituting the negative cemented doublet in the second lens group II.

The condition (8) is established in order to reduce variation of spherical aberration to be caused when the zoom lens system is focused in an object at a short distance from the state that it is focused on an object at the infinite distance and vice versa. If the value defined by the condition (8) becomes smaller than the lower limit thereof, it is impossible to make the above-mentioned variation of spherical aberration small. If the value defined by the condition (8) becomes larger than the upper limit thereof, offaxial aberrations, especially astigmatism, tend to become unfavourable.

The condition (9) defines the difference between the refractive indices of the two lens elements constituting the positive cemented doublet in the first lens group I (focusing lens group) and serves to reduce vatiation of aberrations to be caused by the first lens group I. If the value defined by the condition (9) becomes larger than the upper limit thereof or smaller than the lower limit thereof, variation of aberrations, especially variation of astigmatism, tends to become large. Besides, coma becomes unfavourable when the zoom lens system is focused on an object at the infinite distance.

The condition (10) defines the refractive index of the positive single lens constituting the first lens group I. Said positive single lens has smaller influence on variation of aberrations to be caused at the time of focusing compared with the positive cemented doublet in the first lens group I. However, when $n_3$ becomes smaller than the lower limit of the condition (10), $r_1$ becomes small and spherical aberration will be undercorrected when the distance to the object, on which the zoom lens system is focused, becomes shorter. When $n_3$ becomes larger than the upper limit of the condition (10), Peztval's sum tends to become a negative value.

The condition (11) defines the difference between the refractive indices of the positive lens and negative lens constituting the negative cemented doublet in the second lens group II (variator). When the value defined by the condition (11) becomes larger than the upper limit thereof, it is impossible to favourably correct aberrations of higher order caused by the negative lens with the lower refractive index. Besides, as the refractive power of the variator itself becomes small, a larger moving space is required. If the value defined by the condition (11) becomes smaller than the lower limit thereof, variation of aberrations at the time of zooming becomes large.

DETAILED DESCRIPTION OF THE PREFERRED EMBODIMENTS

Figure 1:
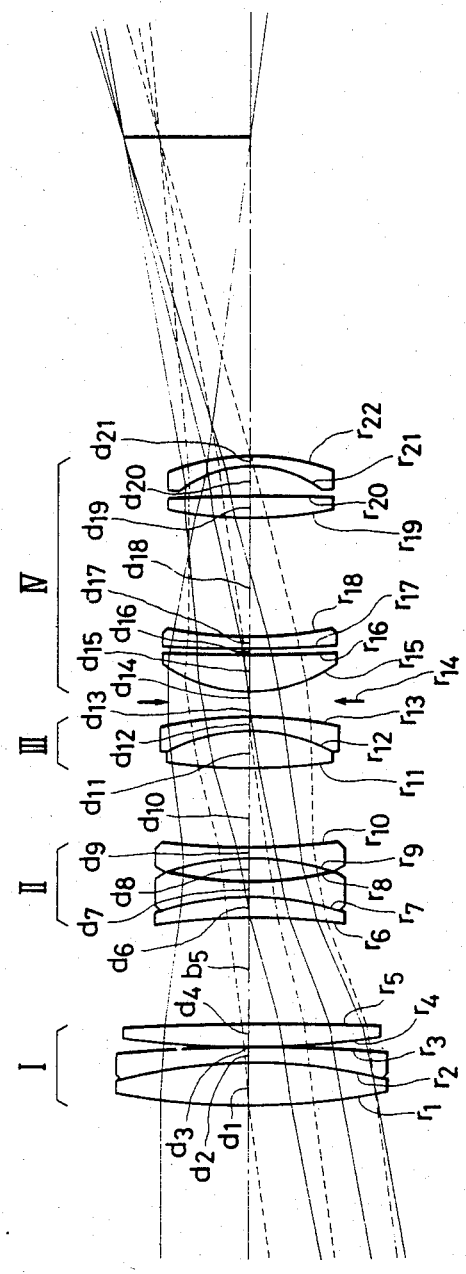
FIG. 1 shows a sectional view of the zoom lens system according to the present invention.

Now, preferred embodiments of the zoom lens system according to the present invention described so far are shown below.

| Embodiment 1 | | | |
|---|---|---|---|
| $r_1 = 114.4266$ | | | |
| $d_1 = 6.5000$ | $n_1 = 1.62041$ | $v_1 = 60.27$ | |
| $r_2 = -114.0061$ | | | |
| $d_2 = 2.5000$ | $n_2 = 1.80518$ | $v_2 = 25.43$ | |
| $r_3 = -503.9910$ | | | |
| $d_3 = 0.2000$ | | | |
| $r_4 = 143.0552$ | | | |
| $d_4 = 4.0000$ | $n_3 = 1.48749$ | $v_3 = 70.15$ | |
| $r_5 = -1820.1154$ | | | |
| $d_5$ (variable) | | | |
| $r_6 = 131.4978$ | | | |
| $d_6 = 4.0000$ | $n_4 = 1.89518$ | $v_4 = 25.43$ | |
| $r_7 = -45.0313$ | | | |
| $d_7 = 1.7000$ | $n_5 = 1.48749$ | $v_5 = 70.15$ | |
| $r_8 = 55.4949$ | | | |
| $d_8 = 4.0000$ | | | |
| $r_9 = -44.4590$ | | | |
| $d_9 = 1.4000$ | $n_6 = 1.56873$ | $v_6 = 63.16$ | |
| $r_{10} = 145.6729$ | | | |
| $d_{10}$ (variable) | | | |
| $r_{11} = 156.1381$ | | | |
| $d_{11} = 6.5000$ | $n_7 = 1.57250$ | $v_7 = 57.76$ | |
| $r_{12} = -26.4575$ | | | |
| $d_{12} = 2.0000$ | $n_8 = 1.71736$ | $v_8 = 29.51$ | |
| $r_{13} = -61.9129$ | | | |
| $d_{13}$ (variable) | | | |
| $r_{14} = \infty$ (stop) | | | |
| $d_{14} = 1.5000$ | | | |
| $r_{15} = 25.2207$ | | | |
| $d_{15} = 5.9000$ | $n_9 = 1.48749$ | $v_9 = 70.15$ | |
| $r_{16} = 4203.7771$ | | | |
| $d_{16} = 1.5512$ | | | |
| $r_{17} = -626.0682$ | | | |

-continued

Embodiment 1

| | | |
|---|---|---|
| $d_{17} = 2.1369$ | $n_{10} = 1.83400$ | $\nu_{10} = 37.16$ |
| $r_{18} = 135.8456$ | | |
| $d_{18} = 21.918$ | | |
| $r_{19} = 77.2753$ | | |
| $d_{19} = 3.2000$ | $n_{11} = 1.65016$ | $\nu_{11} = 39.39$ |
| $r_{20} = -149.1128$ | | |
| $d_{20} = 5.0000$ | | |
| $r_{21} = -20.9916$ | | |
| $d_{21} = 1.9866$ | $n_{12} = 1.77250$ | $\nu_{12} = 49.66$ |
| $r_{22} = -45.9368$ | | |
| $f = 76.0 \sim 146.0$, F/3.6 | | |

| | $d_5$ | $d_{10}$ | $d_{13}$ |
|---|---|---|---|
| wide position | 2.202 (5.621) | 24.862 | 8.787 |
| teleposition | 30.288 (31.974) | 0.603 | 4.959 |
| $1/\phi_R = 92.383$, $1/\phi_{9,10} = 78.895$, $1/\phi_{12} = -51.840$ | | | |

Embodiment 2

| | | |
|---|---|---|
| $r_1 = 114.6273$ | | |
| $d_1 = 6.5000$ | $n_1 = 1.61700$ | $\nu_1 = 62.79$ |
| $r_2 = -123.3064$ | | |
| $d_2 = 2.5000$ | $n_2 = 1.80518$ | $\nu_2 = 25.43$ |
| $r_3 = -742.6218$ | | |
| $d_3 = 0.2000$ | | |
| $r_4 = 113.2170$ | | |
| $d_4 = 4.0000$ | $n_3 = 1.48749$ | $\nu_3 = 70.15$ |
| $r_5 = -1444.3487$ | | |
| $d_5$ (variable) | | |
| $r_6 = -144.9817$ | | |
| $d_6 = 4.0000$ | $n_4 = 1.80518$ | $\nu_4 = 25.43$ |
| $r_7 = -43.5873$ | | |
| $d_7 = 1.7000$ | $n_5 = 1.48749$ | $\nu_5 = 70.15$ |
| $r_8 = 49.7389$ | | |
| $d_8 = 4.4000$ | | |
| $r_9 = -40.8422$ | | |
| $d_9 = 1.4000$ | $n_6 = 1.61700$ | $\nu_6 = 62.79$ |
| $r_{10} = 171.2489$ | | |
| $d_{10}$ (variable) | | |
| $r_{11} = 124.8815$ | | |
| $d_{11} = 6.5000$ | $n_7 = 1.51112$ | $\nu_7 = 60.48$ |
| $r_{12} = -24.4313$ | | |
| $d_{12} = 2.0000$ | $n_8 = 1.69895$ | $\nu_8 = 30.12$ |
| $r_{13} = -49.0791$ | | |
| $d_{13}$ (variable) | | |
| $r_{14} = \infty$ (stop) | | |
| $d_{14} = 1.5000$ | | |
| $r_{15} = 23.7091$ | | |
| $d_{15} = 6.7000$ | $n_9 = 1.48749$ | $\nu_9 = 70.15$ |
| $r_{16} = -2632.2362$ | | |
| $d_{16} = 0.7000$ | | |
| $r_{17} = 444.5448$ | | |
| $d_{17} = 2.1369$ | $n_{10} = 1.83400$ | $\nu_{10} = 37.16$ |
| $r_{18} = 71.7015$ | | |
| $d_{18} = 20.1407$ | | |
| $r_{19} = 70.0214$ | | |
| $d_{19} = 3.2000$ | $n_{11} = 1.80440$ | $\nu_{11} = 39.58$ |
| $r_{20} = -543.4698$ | | |
| $d_{20} = 3.7000$ | | |
| $r_{21} = -20.3811$ | | |
| $d_{21} = 2.0000$ | $n_{12} = 1.77250$ | $\nu_{12} = 49.66$ |
| $r_{22} = -39.1623$ | | |
| $f = 76.0 \sim 146.0$, F/3.6 | | |

| | $d_5$ | $d_{10}$ | $d_{13}$ |
|---|---|---|---|
| wide position | 2.203 (5.270) | 22.119 | 8.859 |
| teleposition | 28.930 (30.443) | 0.900 | 3.352 |
| $1/\phi_R = 90.759$, $1/\phi_{9,10} = 81.152$, $1/\phi_{12} = -57.692$ | | | |

Embodiment 3

| | | |
|---|---|---|
| $r_1 = 103.8824$ | | |
| $d_1 = 6.5000$ | $n_1 = 1.62041$ | $\nu_1 = 60.27$ |
| $r_2 = -106.7019$ | | |
| $d_2 = 2.5000$ | $n_2 = 1.78472$ | $\nu_2 = 25.71$ |
| $r_3 = -602.4131$ | | |
| $d_3 = 0.2000$ | | |
| $r_4 = 191.3289$ | | |
| $d_4 = 4.0000$ | $n_3 = 1.58913$ | $\nu_3 = 60.97$ |
| $r_5 = \infty$ | | |
| $d_5$ (variable) | | |
| $r_6 = -111.4801$ | | |
| $d_6 = 4.0000$ | $n_4 = 1.84666$ | $\nu_4 = 23.88$ |
| $r_7 = -43.1454$ | | |
| $d_7 = 1.7000$ | $n_5 = 1.48749$ | $\nu_5 = 70.15$ |
| $r_8 = 54.7964$ | | |
| $d_8 = 4.7000$ | | |
| $r_9 = -41.3299$ | | |
| $d_9 = 1.4000$ | $n_6 = 1.54771$ | $\nu_6 = 62.83$ |
| $r_{10} = 141.4656$ | | |
| $d_{10}$ (variable) | | |
| $r_{11} = 118.5101$ | | |
| $d_{11} = 6.5000$ | $n_7 = 1.48749$ | $\nu_7 = 70.15$ |
| $r_{12} = -27.0792$ | | |
| $d_{12} = 2.0000$ | $n_8 = 1.74077$ | $\nu_8 = 27.79$ |
| $r_{13} = -48.8340$ | | |
| $d_{13}$ (variable) | | |
| $r_{14} = \infty$ (stop) | | |
| $d_{14} = 1.5000$ | | |
| $r_{15} = 23.5727$ | | |
| $d_{15} = 6.7000$ | $n_9 = 1.48749$ | $\nu_9 = 70.15$ |
| $r_{16} = 403.4998$ | | |
| $d_{16} = 0.7000$ | | |
| $r_{17} = 911.4731$ | | |
| $d_{17} = 2.1369$ | $n_{10} = 1.83400$ | $\nu_{10} = 37.16$ |
| $r_{18} = 111.1759$ | | |
| $d_{18} = 19.7725$ | | |
| $r_{19} = 60.8755$ | | |
| $d_{19} = 3.20000$ | $n_{11} = 1.63980$ | $\nu_{11} = 34.43$ |
| $r_{20} = -328.0102$ | | |
| $d_{20} = 3.7000$ | | |
| $r_{21} = -19.8174$ | | |
| $d_{21} = 2.0000$ | $n_{12} = 1.83481$ | $\nu_{12} = 42.72$ |
| $r_{22} = -37.8971$ | | |
| $f = 76.0 \sim 146.0$, F/3.6 | | |

| | $d_5$ | $d_{10}$ | $d_{13}$ |
|---|---|---|---|
| wide position | 2.316 (5.929) | 21.452 | 11.069 |
| teleposition | 31.938 (33.718) | 0.630 | 2.269 |
| $1/\phi_R = 86.200$, $1/\phi_{9,10} = 72.045$, $1/\phi_{12} = -52.397$ | | | |

Embodiment 4

| | | |
|---|---|---|
| $r_1 = 110.8822$ | | |
| $d_1 = 6.5000$ | $n_1 = 1.61700$ | $\nu_1 = 62.79$ |
| $r_2 = -112.4859$ | | |
| $d_2 = 2.5000$ | $n_2 = 1.80518$ | $\nu_2 = 25.43$ |
| $r_3 = -519.9799$ | | |
| $d_3 = 0.2000$ | | |
| $r_4 = 119.6558$ | | |
| $d_4 = 4.0000$ | $n_3 = 1.48749$ | $\nu_3 = 70.15$ |
| $r_5 = -1448.6721$ | | |
| $d_5$ (variable) | | |
| $r_6 = -143.9423$ | | |
| $d_6 = 4.000$ | $n_4 = 1.80518$ | $\nu_4 = 25.43$ |
| $r_7 = -41.9617$ | | |
| $d_7 = 1.7000$ | $n_5 = 1.48749$ | $\nu_5 = 70.15$ |
| $r_8 = 52.6514$ | | |
| $d_8 = 4.4000$ | | |
| $r_9 = -40.4673$ | | |
| $d_9 = 1.4000$ | $n_6 = 1.61700$ | $\nu_6 = 62.79$ |
| $r_{10} = 134.6846$ | | |
| $d_{10}$ (variable) | | |
| $r_{11} = 123.8962$ | | |
| $d_{11} = 6.5000$ | $n_7 = 1.50378$ | $\nu_7 = 66.81$ |
| $r_{12} = -25.5701$ | | |
| $d_{12} = 2.0000$ | $n_8 = 1.69895$ | $\nu_8 = 30.12$ |
| $r_{13} = -51.8687$ | | |
| $d_{13}$ (variable) | | |
| $r_{14} = \infty$ (stop) | | |
| $d_{14} = 1.5000$ | | |
| $r_{15} = 23.9862$ | | |
| $d_{15} = 6.7000$ | $n_9 = 1.48749$ | $\nu_9 = 70.15$ |
| $r_{16} = 2509.3471$ | | |

-continued

Embodiment 4

| | | |
|---|---|---|
| $d_{16} = 0.7000$ | | |
| $r_{17} = 475.6668$ | | |
| $d_{17} = 2.1369$ | $n_{10} = 1.83400$ | $\nu_{10} = 37.16$ |
| $r_{18} = 84.9005$ | | |
| $d_{18} = 20.1619$ | | |
| $r_{19} = 73.9490$ | | |
| $d_{19} = 3.2000$ | $n_{11} = 1.80440$ | $\nu_{11} = 39.58$ |
| $r_{20} = -502.5539$ | | |
| $d_{20} = 3.7000$ | | |
| $r_{21} = -20.0936$ | | |
| $d_{21} = 2.0000$ | $n_{12} = 1.77250$ | $\nu_{12} = 49.66$ |
| $r_{22} = -37.3404$ | | |
| $f = 76.0 \sim 146.0, F/3.6$ | | |

| | $d_5$ | $d_{10}$ | $d_{13}$ |
|---|---|---|---|
| wide position | 2.217 (5.120) | 22.285 | 8.172 |
| teleposition | 27.662 (29.094) | 0.601 | 4.412 |
| $1/\phi_R = 84.207$, $1/\phi_{9,10} = 75.881$, $1/\phi_{12} = -59.314$ | | | |

Embodiment 5

| | | |
|---|---|---|
| $r_1 = 108.9400$ | | |
| $d_1 = 6.5000$ | $n_1 = 1.62041$ | $\nu_1 = 60.27$ |
| $r_2 = -111.2308$ | | |
| $d_2 = 2.5000$ | $n_2 = 1.80518$ | $\nu_2 = 25.43$ |
| $r_3 = -599.8178$ | | |
| $d_3 = 0.2000$ | | |
| $r_4 = 127.8805$ | | |
| $d_4 = 4.0000$ | $n_3 = 1.48749$ | $\nu_3 = 70.15$ |
| $r_5 = -1049.4154$ | | |
| $d_5$ (variable) | | |
| $r_6 = -141.5722$ | | |
| $d_6 = 4.0000$ | $n_4 = 1.84666$ | $\nu_4 = 23.88$ |
| $r_7 = -42.5680$ | | |
| $d_7 = 1.7000$ | $n_5 = 1.51633$ | $\nu_5 = 64.15$ |
| $r_8 = 57.7618$ | | |
| $d_8 = 4.4000$ | | |
| $r_9 = -42.1712$ | | |
| $d_9 = 1.4000$ | $n_6 = 1.62280$ | $\nu_6 = 57.06$ |
| $r_{10} = 128.1566$ | | |
| $d_{10}$ (variable) | | |
| $r_{11} = 145.1361$ | | |
| $d_{11} = 6.5000$ | $n_7 = 1.60729$ | $\nu_7 = 49.19$ |
| $r_{12} = -26.7115$ | | |
| $d_{12} = 2.0000$ | $n_8 = 1.78470$ | $\nu_8 = 26.22$ |
| $r_{13} = -61.1277$ | | |
| $d_{13}$ (variable) | | |
| $r_{14} = \infty$ (stop) | | |
| $d_{14} = 1.5000$ | | |
| $r_{15} = 23.9982$ | | |
| $d_{15} = 6.7000$ | $n_9 = 1.48749$ | $\nu_9 = 70.15$ |
| $r_{16} = 832.5575$ | | |
| $d_{16} = 0.7000$ | | |
| $r_{17} = 568.4760$ | | |
| $d_{17} = 2.1369$ | $n_{10} = 1.83400$ | $\nu_{10} = 37.16$ |
| $r_{18} = 80.9286$ | | |
| $d_{18} = 19.3710$ | | |
| $r_{19} = 70.4960$ | | |
| $d_{19} = 3.2000$ | $n_{11} = 1.80440$ | $\nu_{11} = 39.58$ |
| $r_{20} = -624.5135$ | | |
| $d_{20} = 5.1800$ | | |
| $r_{21} = -20.0501$ | | |
| $d_{21} = 2.0000$ | $n_{12} = 1.77250$ | $\nu_{12} = 49.66$ |
| $r_{22} = -36.8514$ | | |
| $f = 76.049 \sim 145.973, F/3.6$ | | |

| | $d_5$ | $d_{10}$ | $d_{13}$ |
|---|---|---|---|
| wide position | 2.521 (5.545) | 22.465 | 8.451 |
| teleposition | 28.646 (30.139) | 0.763 | 4.027 |
| $1/\phi_R = 87.683$, $1/\phi_{9,10} = 82.456$, $1/\phi_{12} = -60.043$ | | | |

In embodiments shown in the above, reference symbols $r_1$ through $r_{22}$ respectively represent radii of curvature of respective lens surfaces, reference symbols $d_1$ through $d_{21}$ respectively represent thicknesses of respective lenses and airspaces between respective lenses, reference symbols $n_1$ through $n_{12}$ respectivey represent refractive indices of respective lenses, and reference symbols $\nu_1$ through $\nu_{12}$ respectively represent Abbe's numbers of respective lenses.

Figure 2:
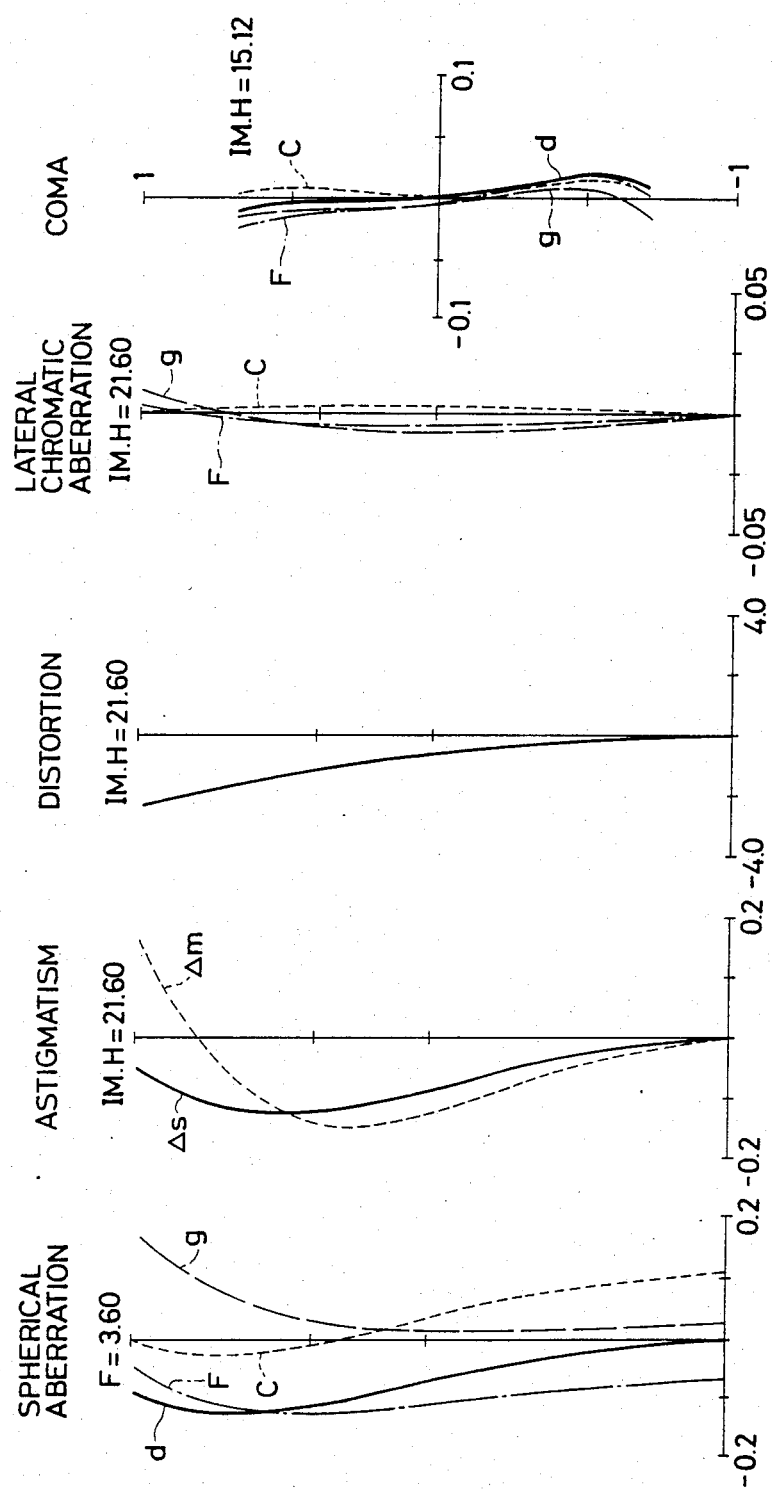
FIGS. 2 through 5 respectively show graphs illustrating aberration curves of Embodiment 1 of the zoom lens system according to the present invention.
Figure 3:
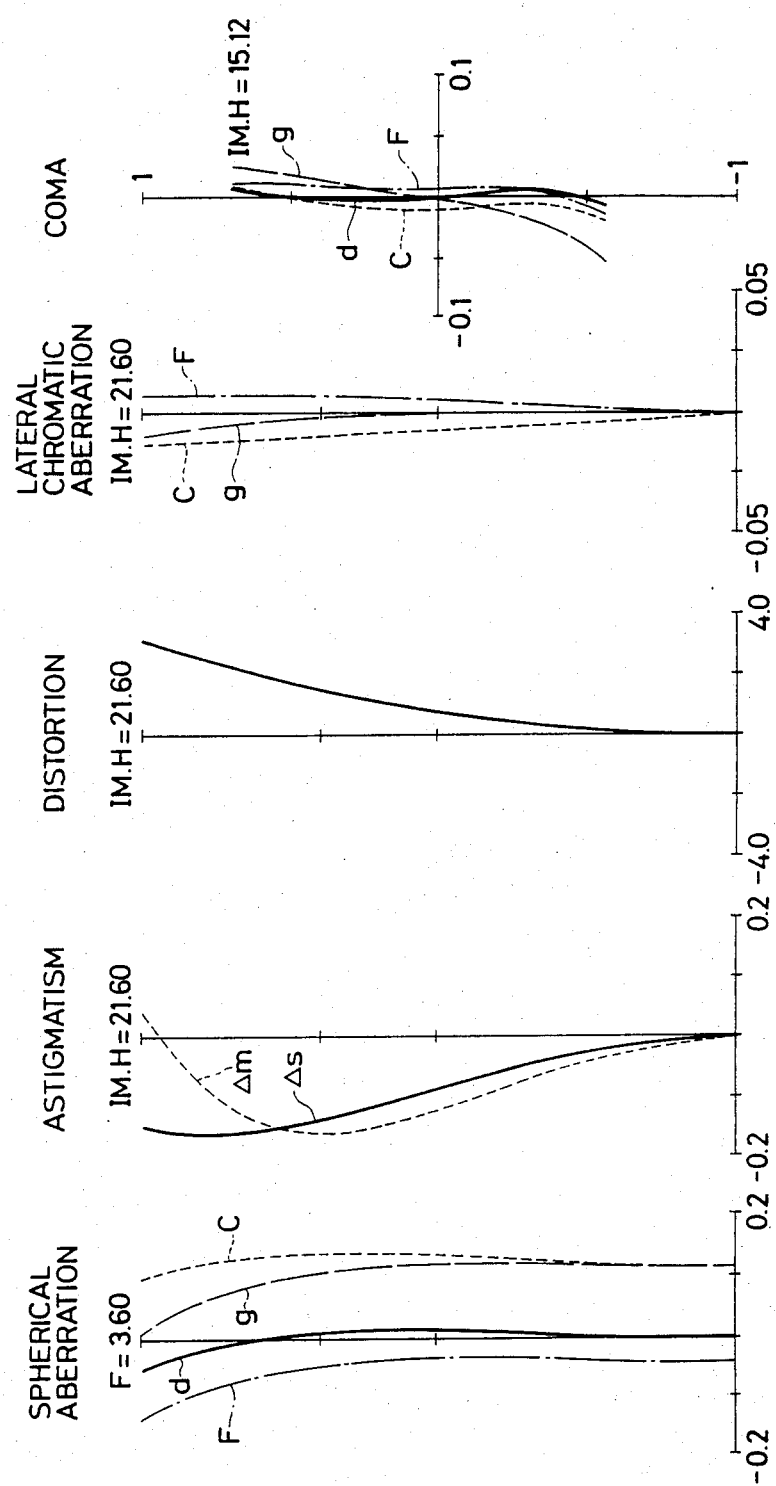
Figure 4:
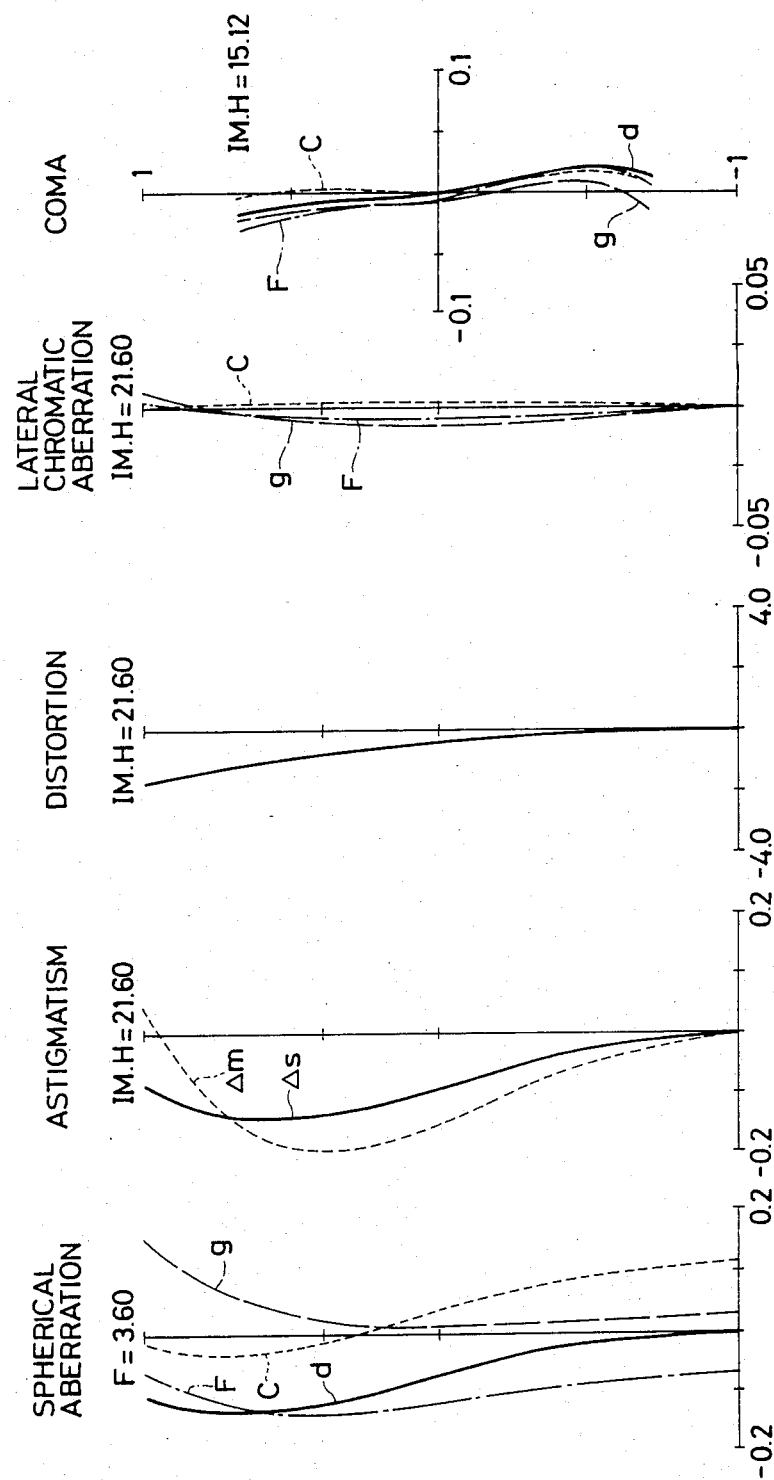
Figure 5:
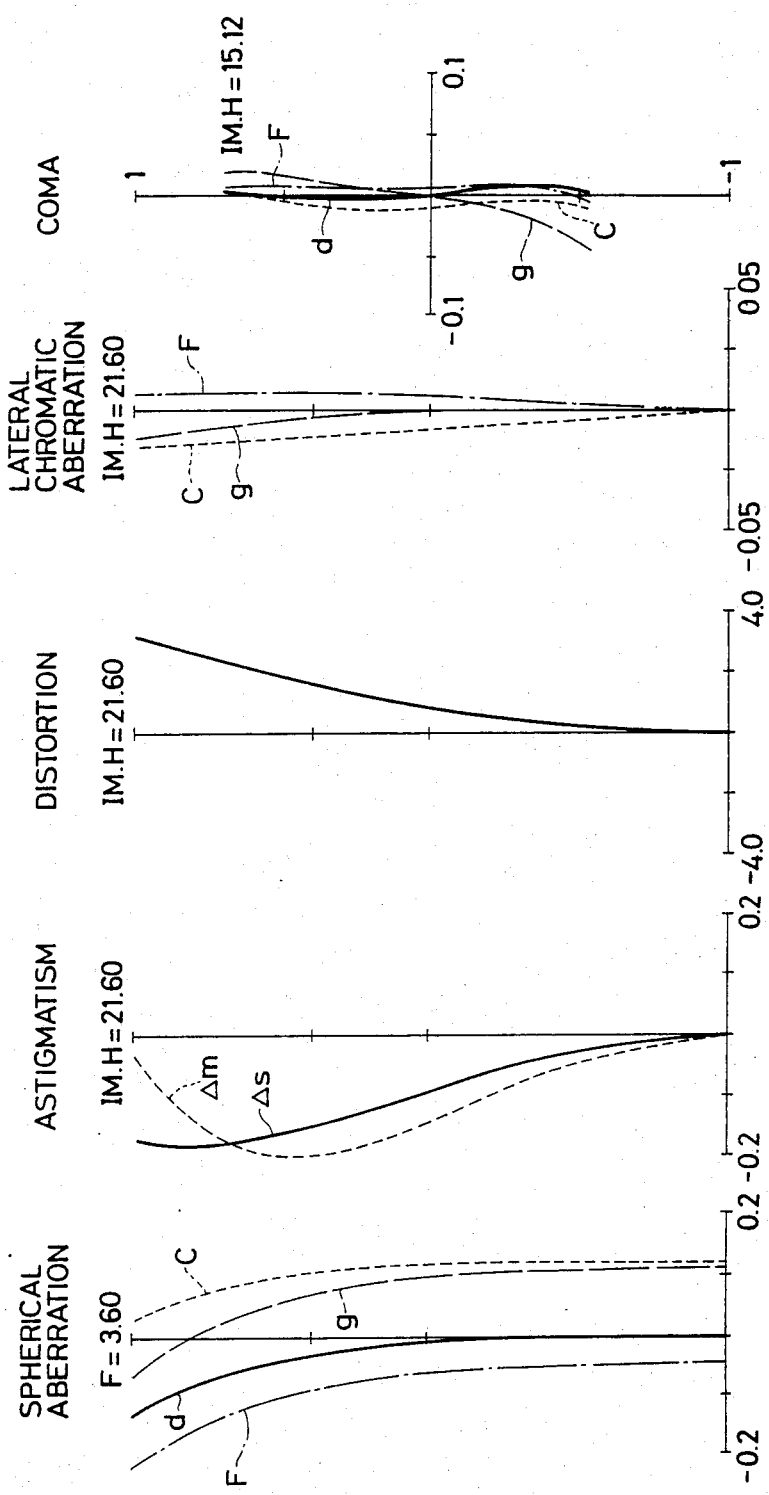
Figure 6:
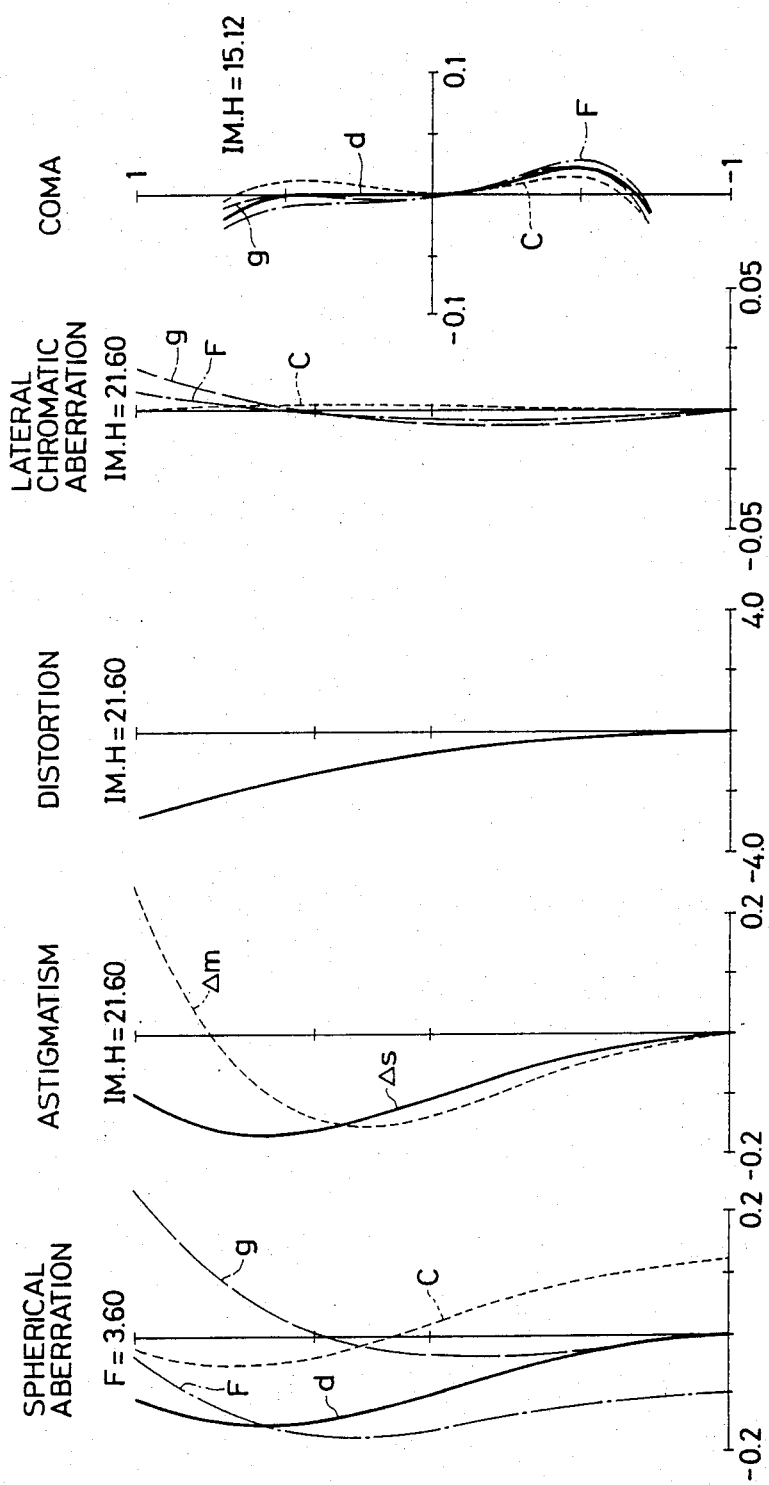
FIGS. 6 through 9 respectively show graphs illustrating aberration curves of Embodiment 2 of the present invention.
Figure 7:
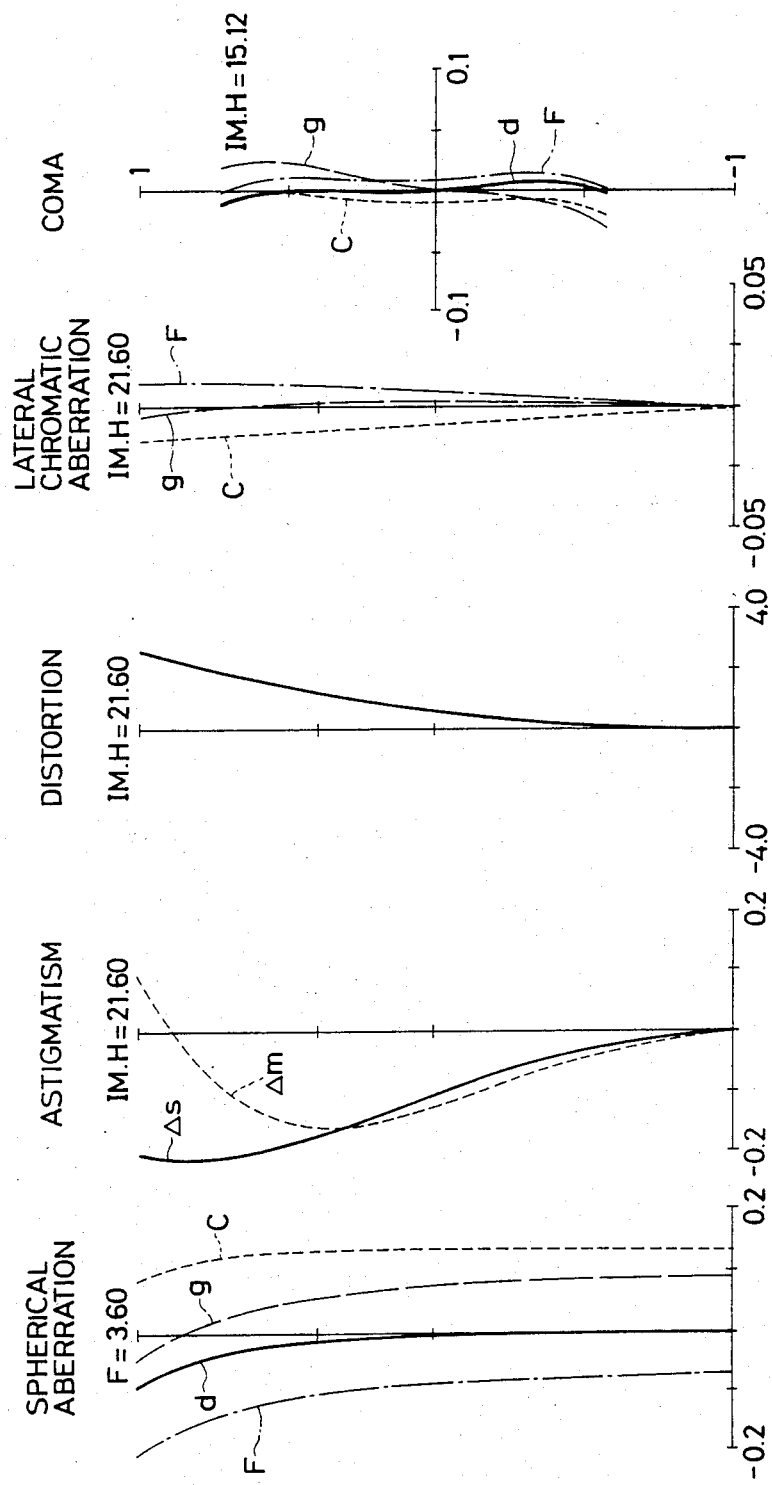
Figure 8:
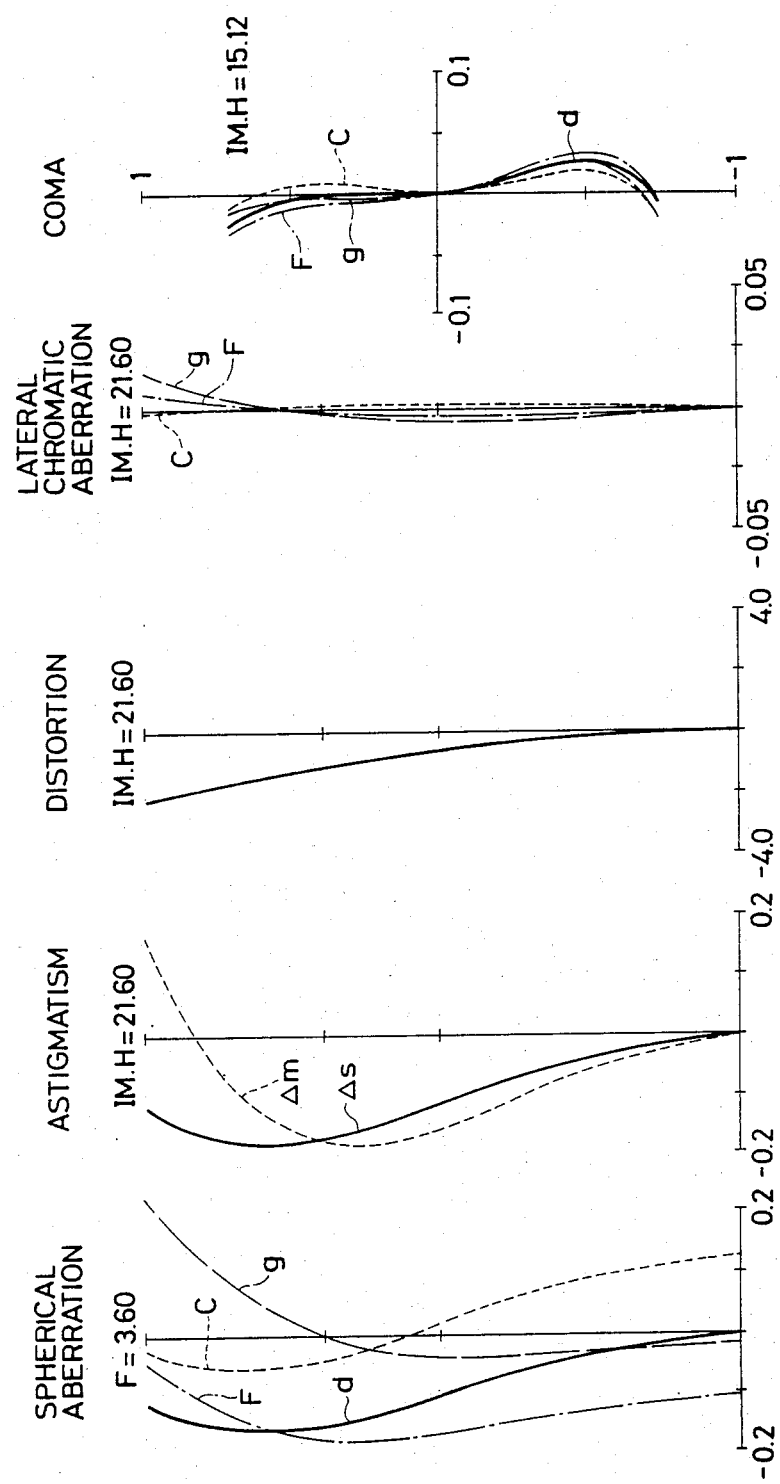
Figure 9:
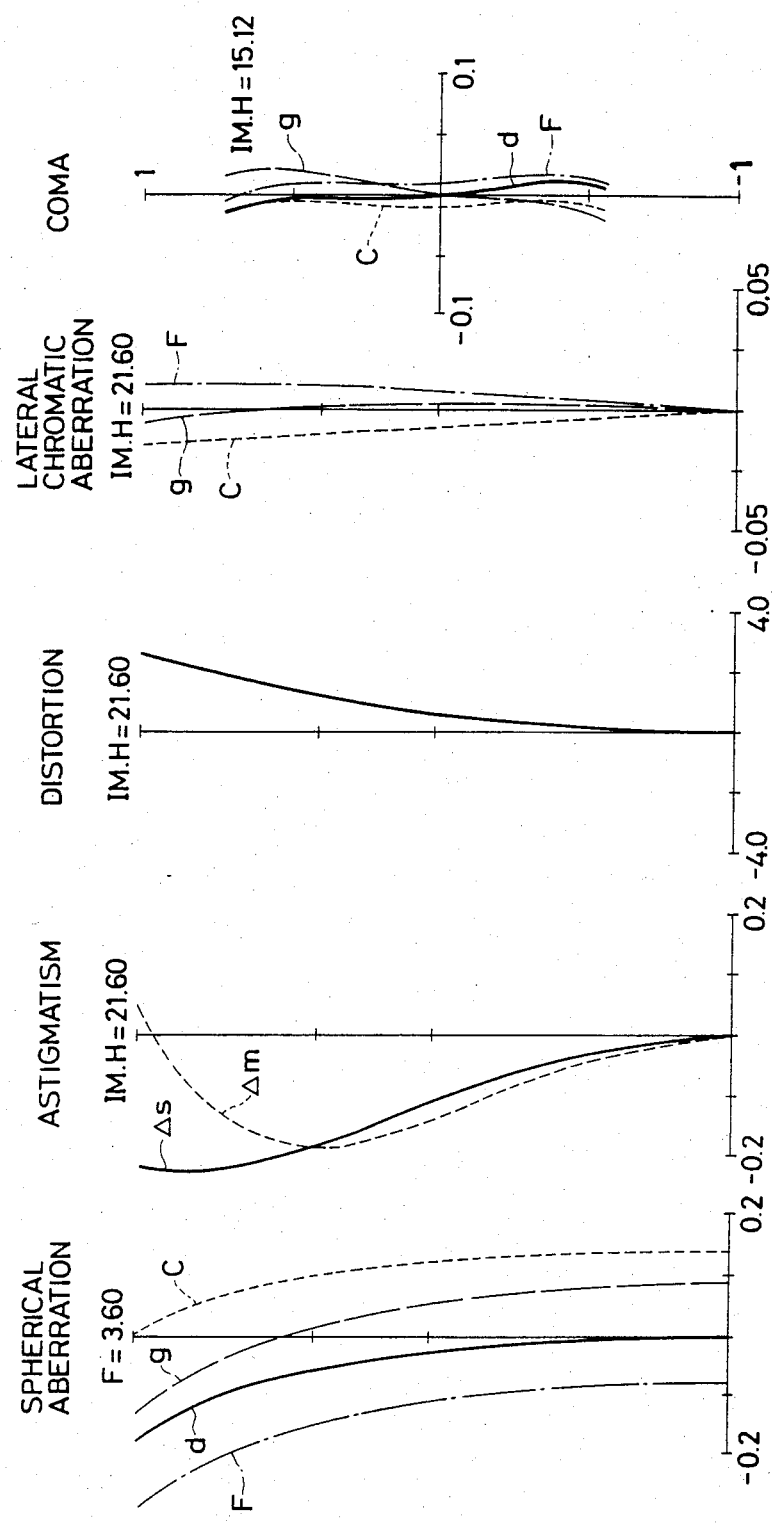
Figure 10:
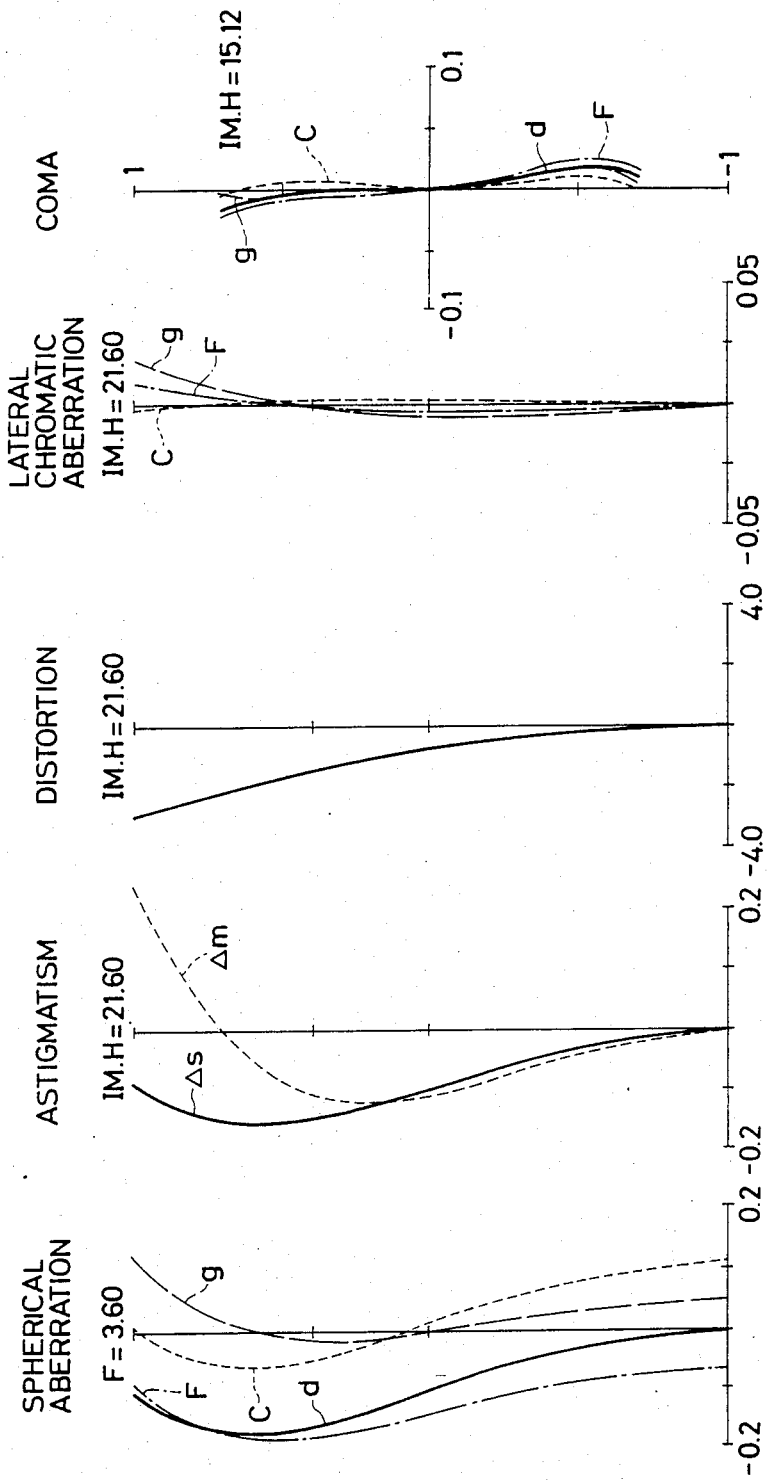
FIGS. 10 through 13 respectively show graphs illustrating aberration curves of Embodiment 3 of the present invention.
Figure 11:
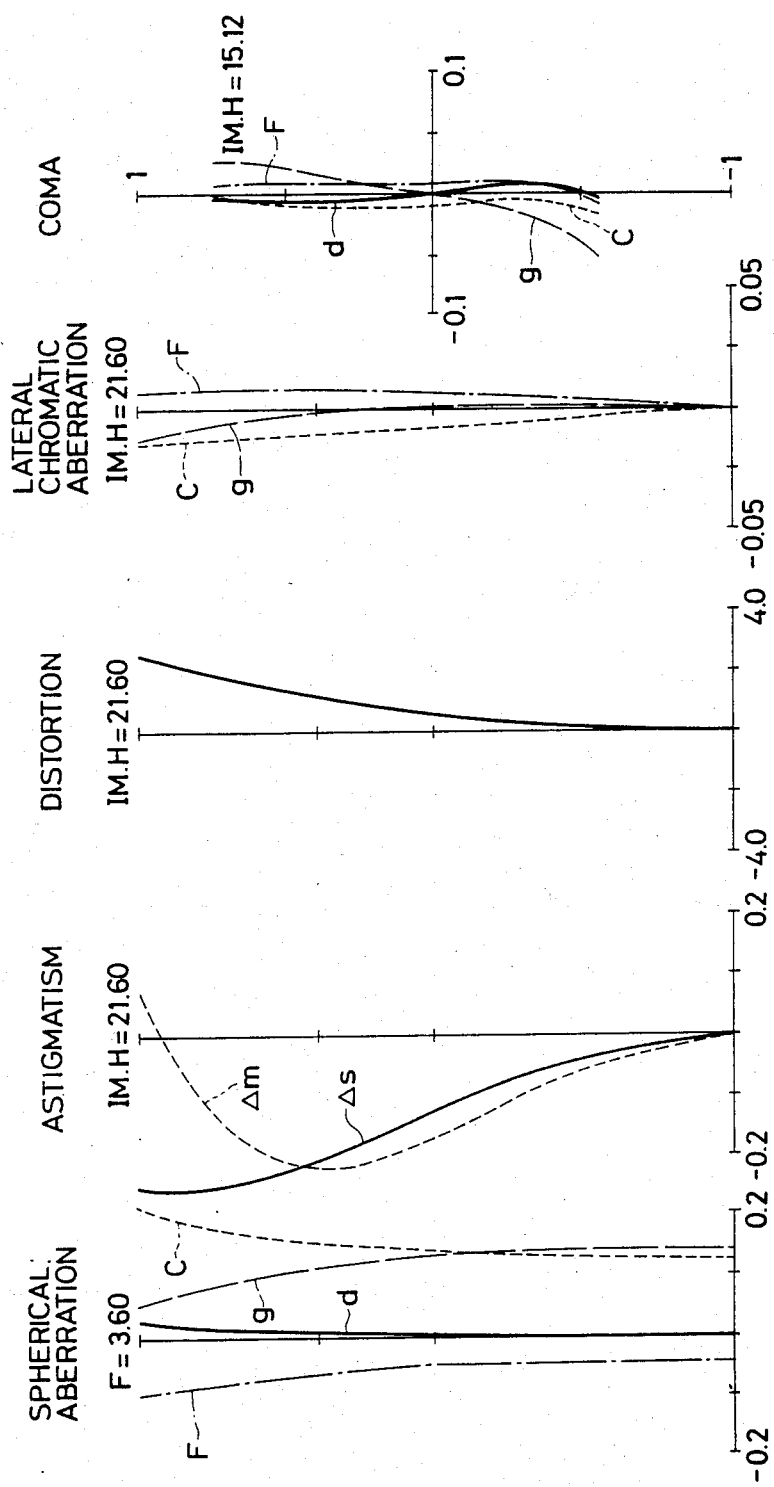
Figure 12:
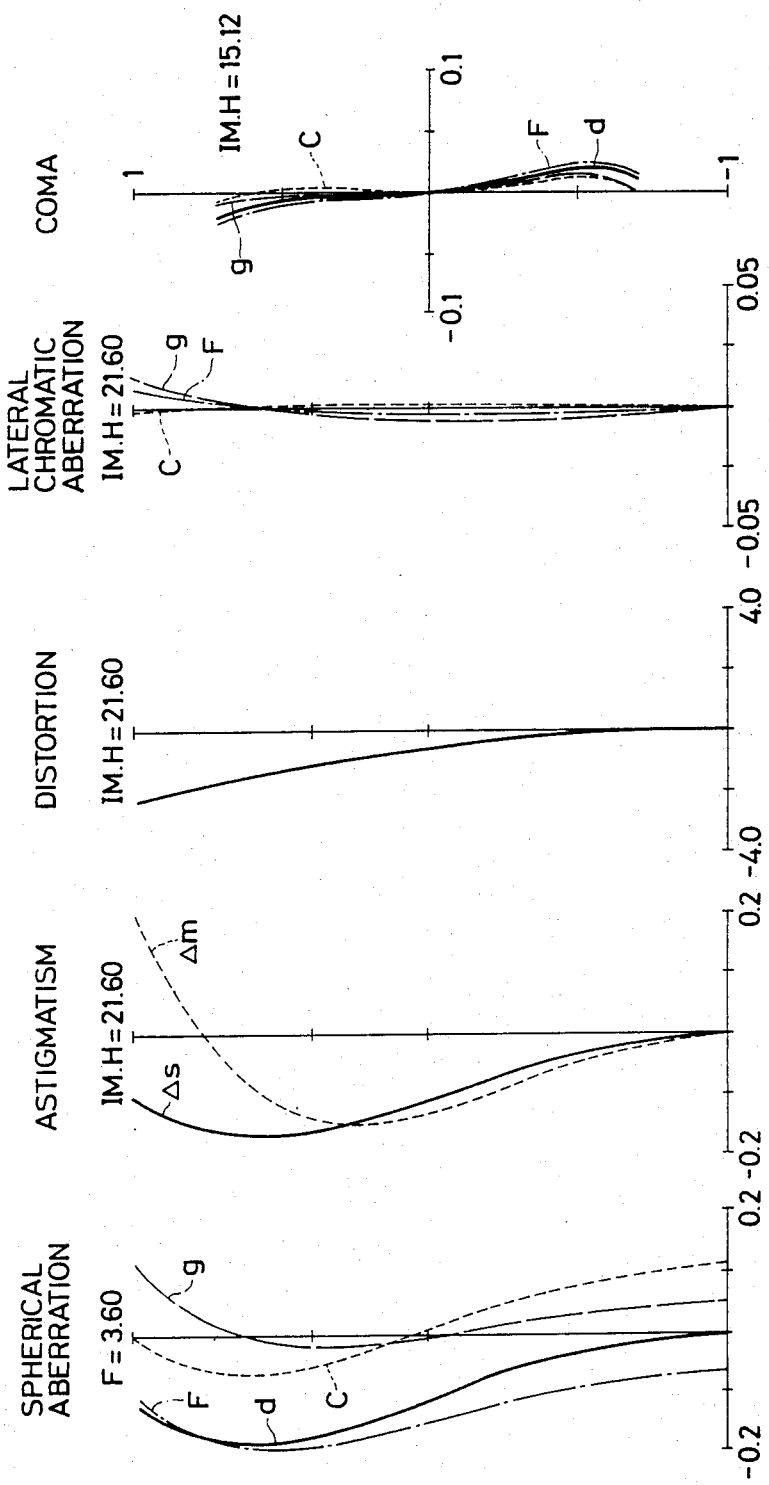
Figure 13:
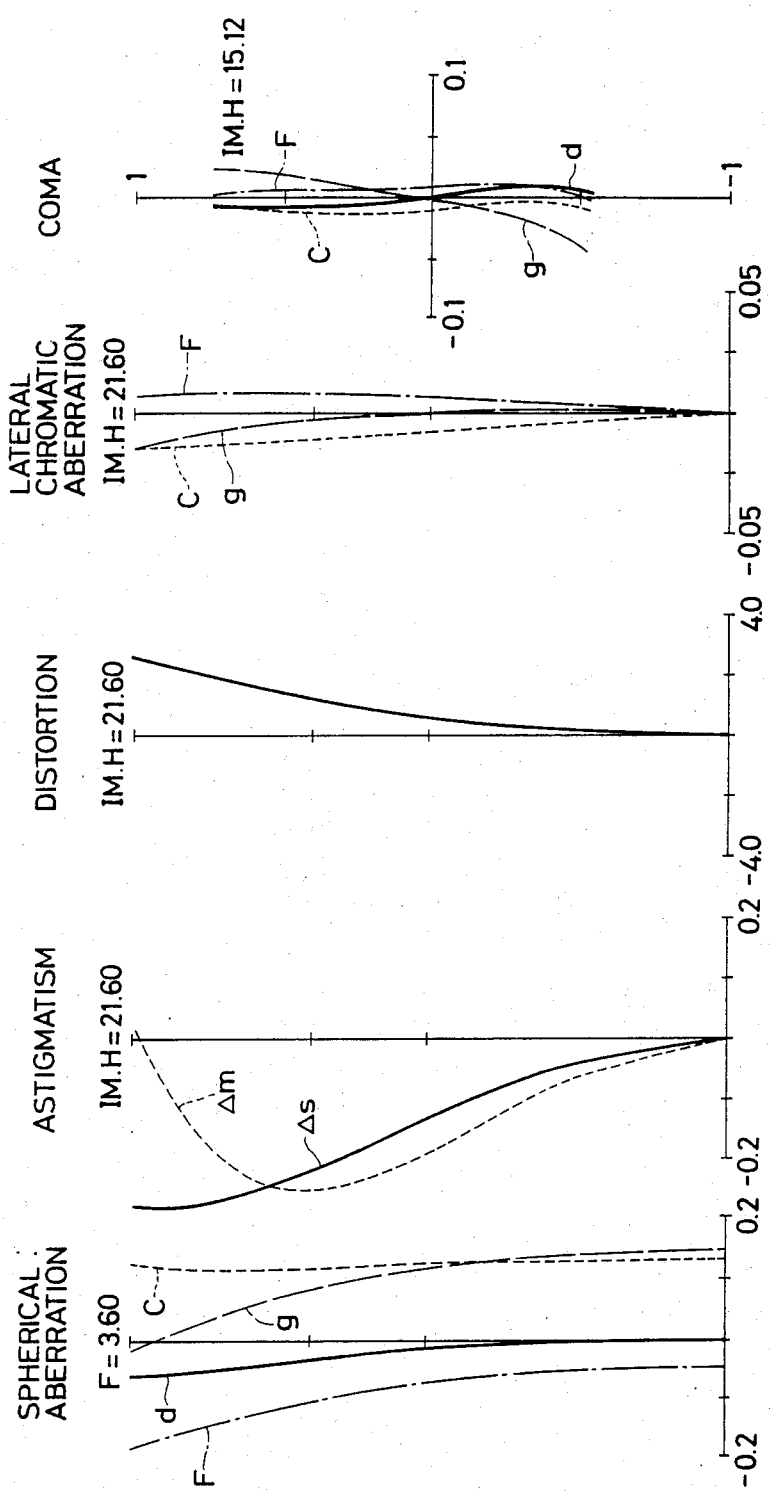
Figure 14:
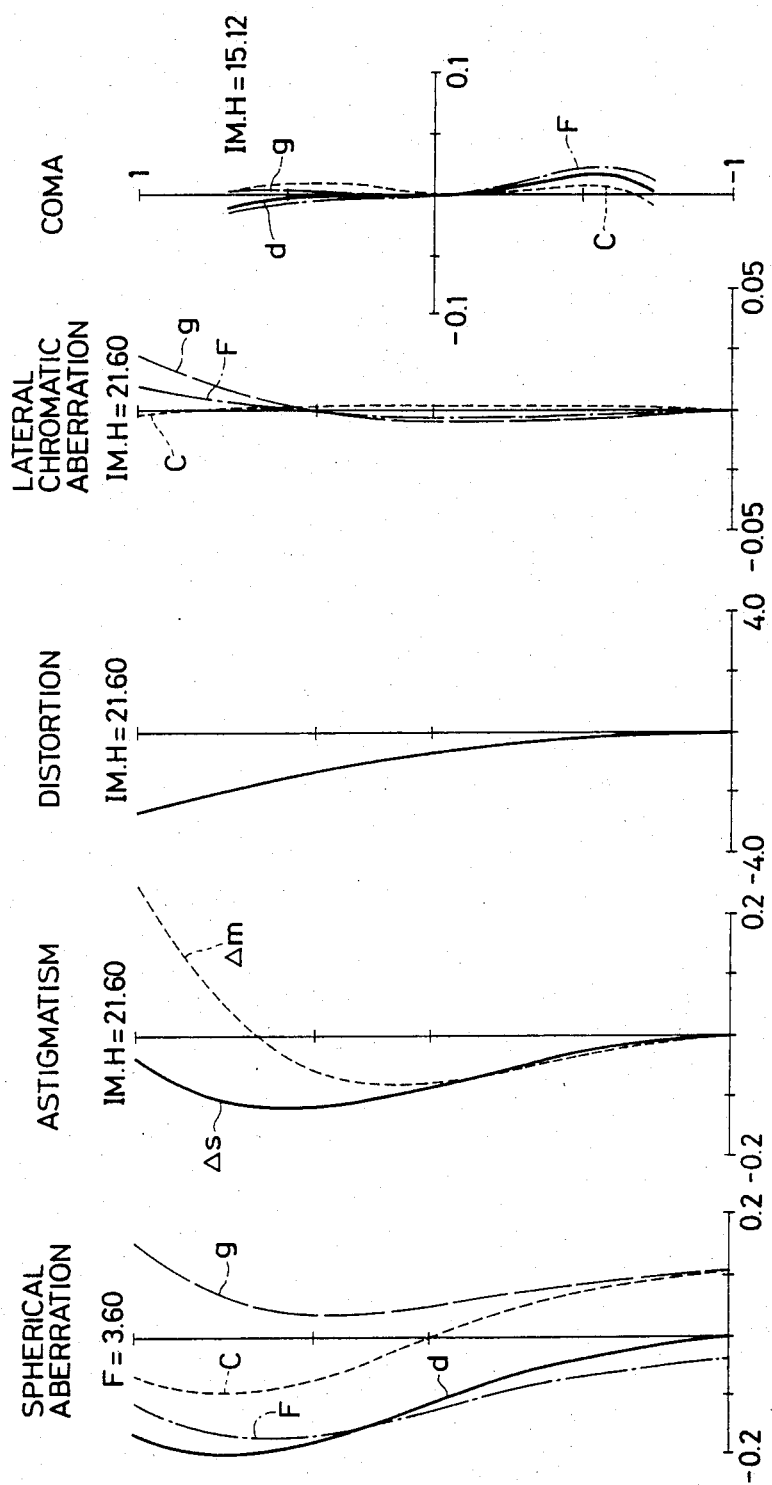
FIGS. 14 through 17 respectively show graphs illustrating aberration curves of Embodiment 4 of the present invention.
Figure 15:
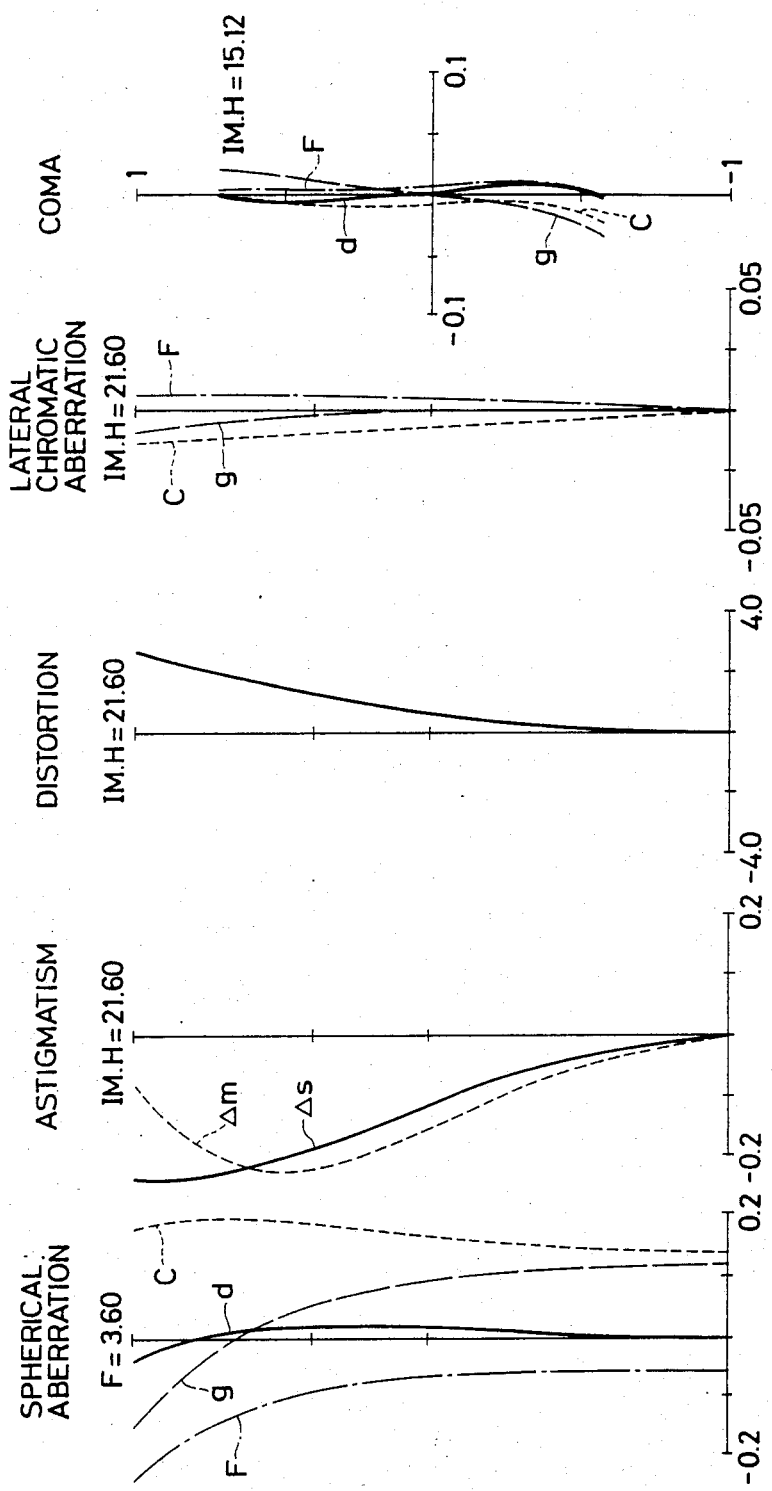
Figure 16:
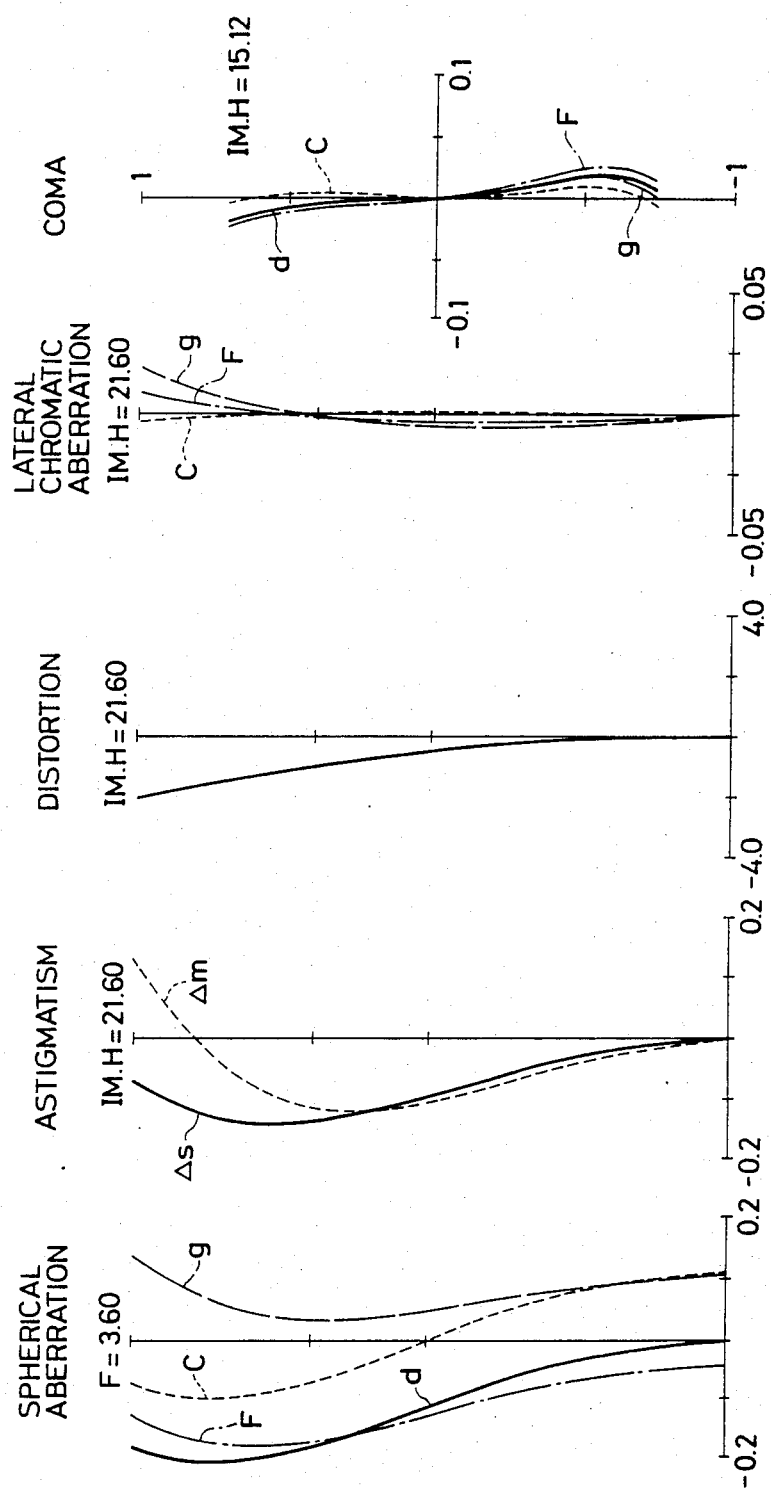
Figure 17:
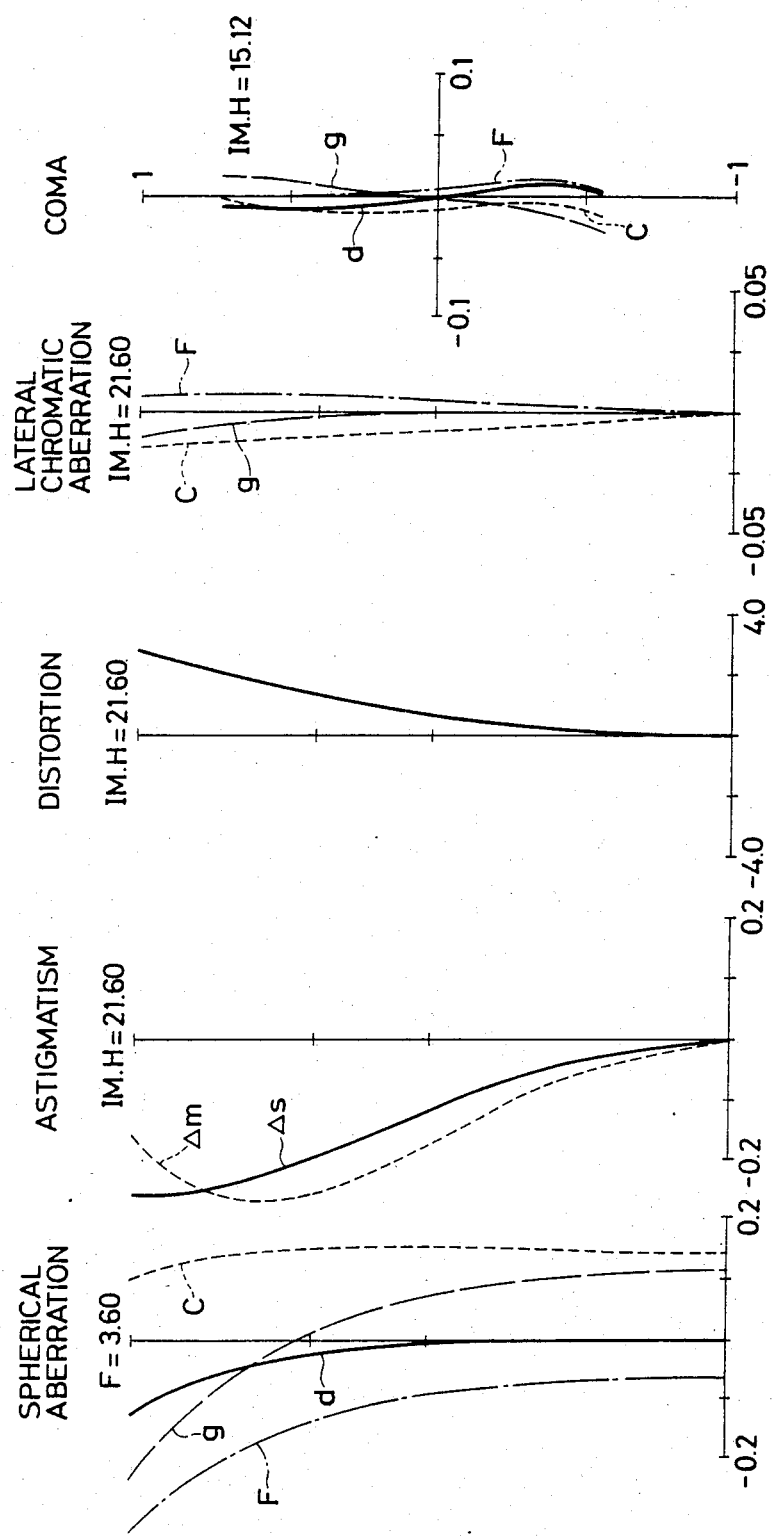
Figure 18:
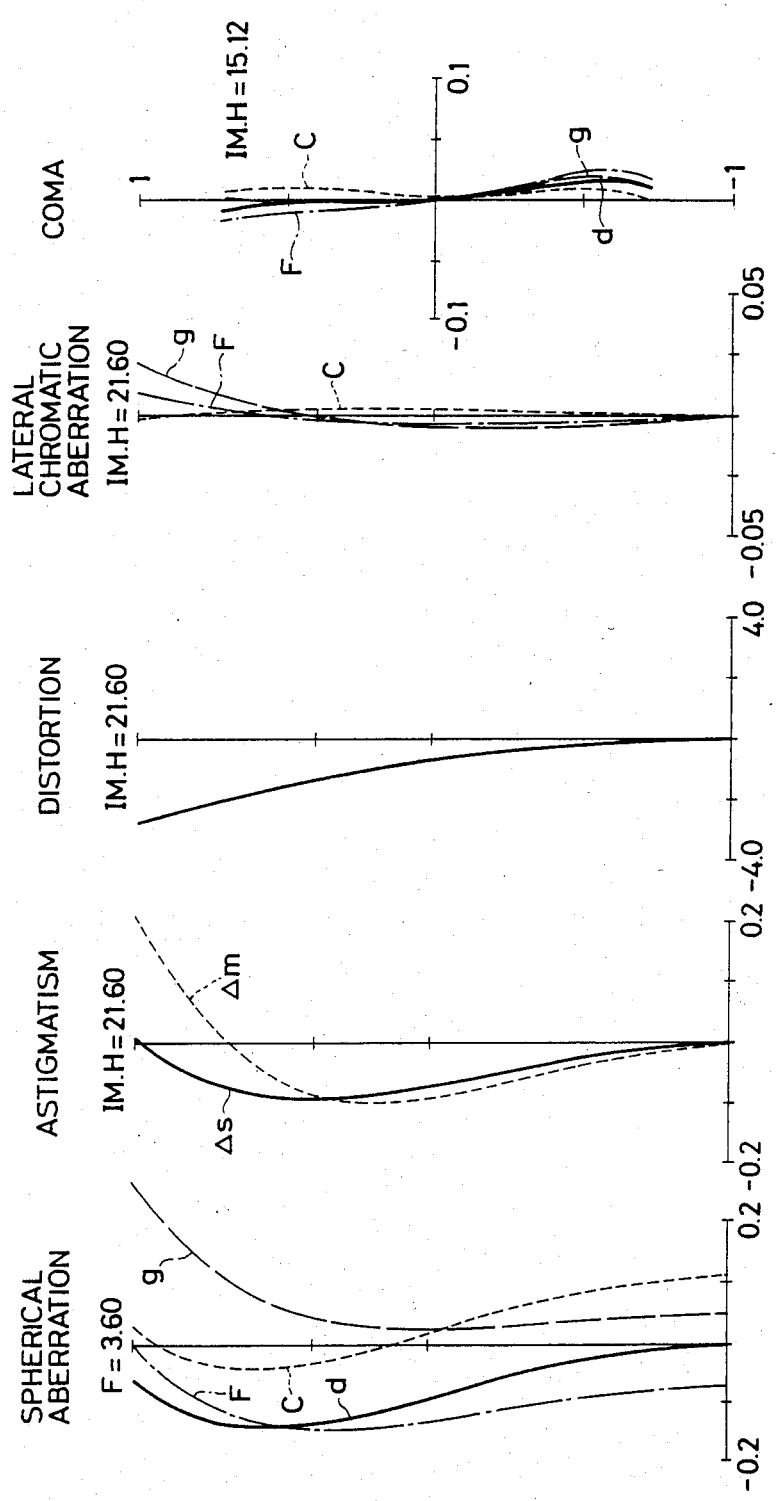
FIGS. 18 through 21 respectively show graphs illustrating aberration curves of Embodiment 5 of the present invention.
Figure 19:
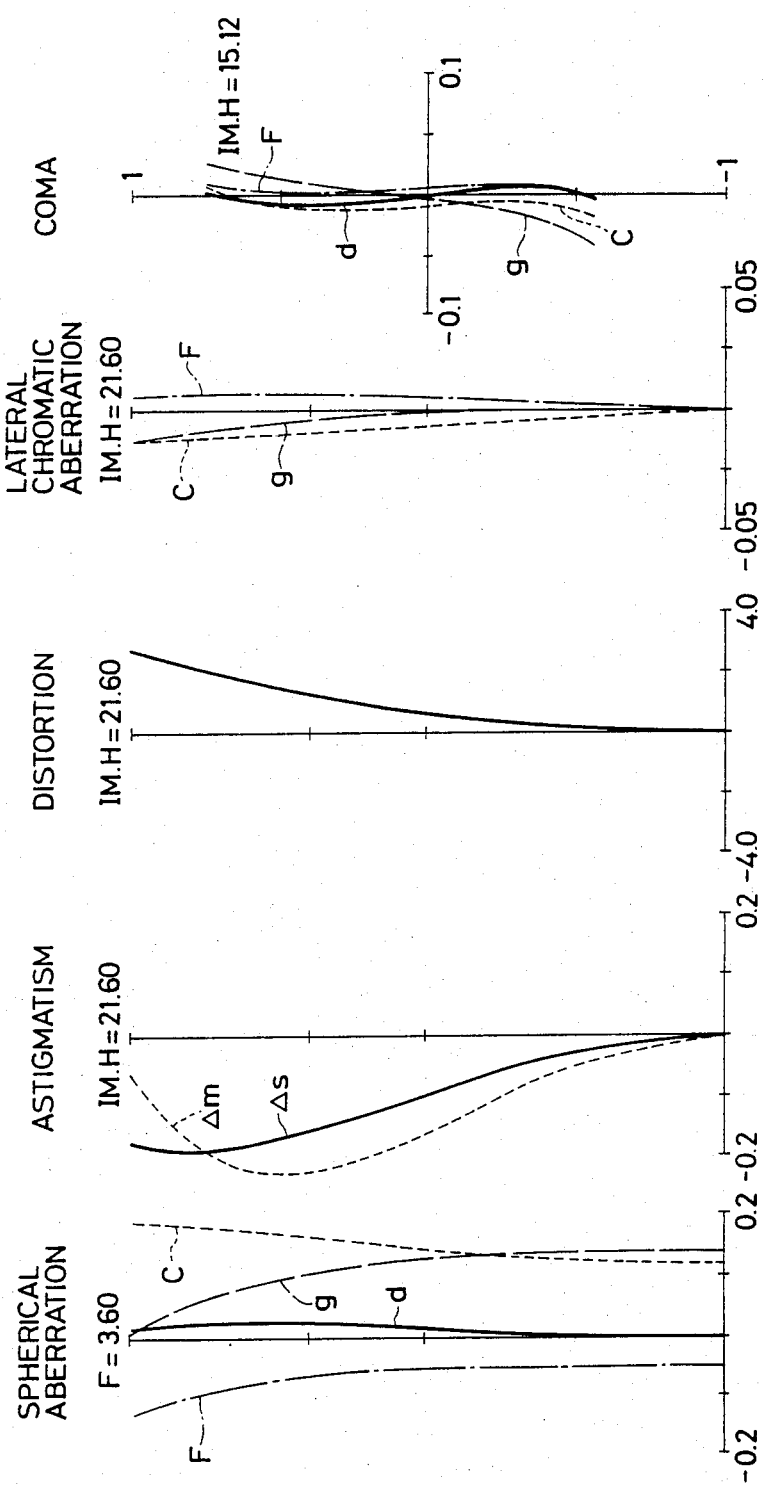
Figure 20:
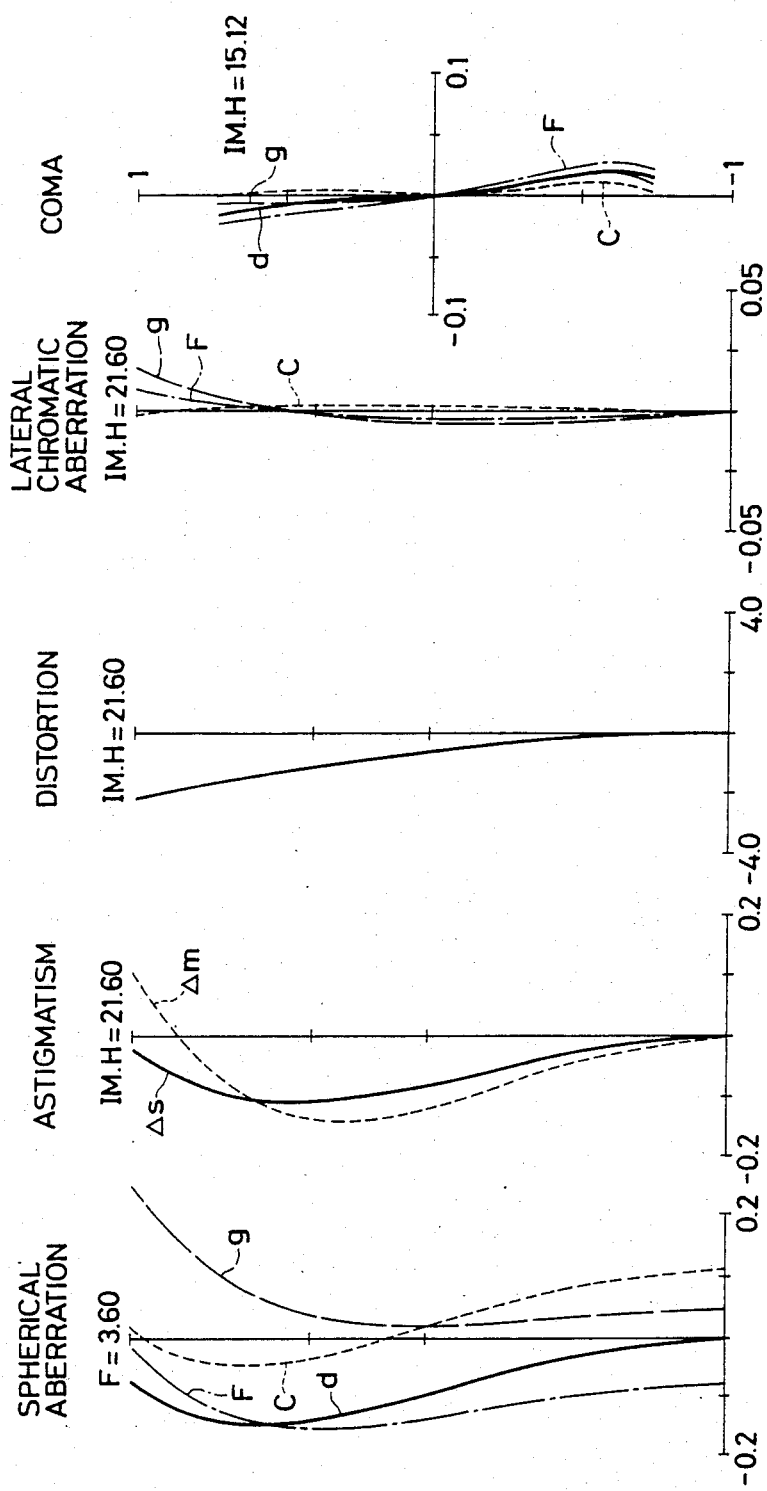
Figure 21:
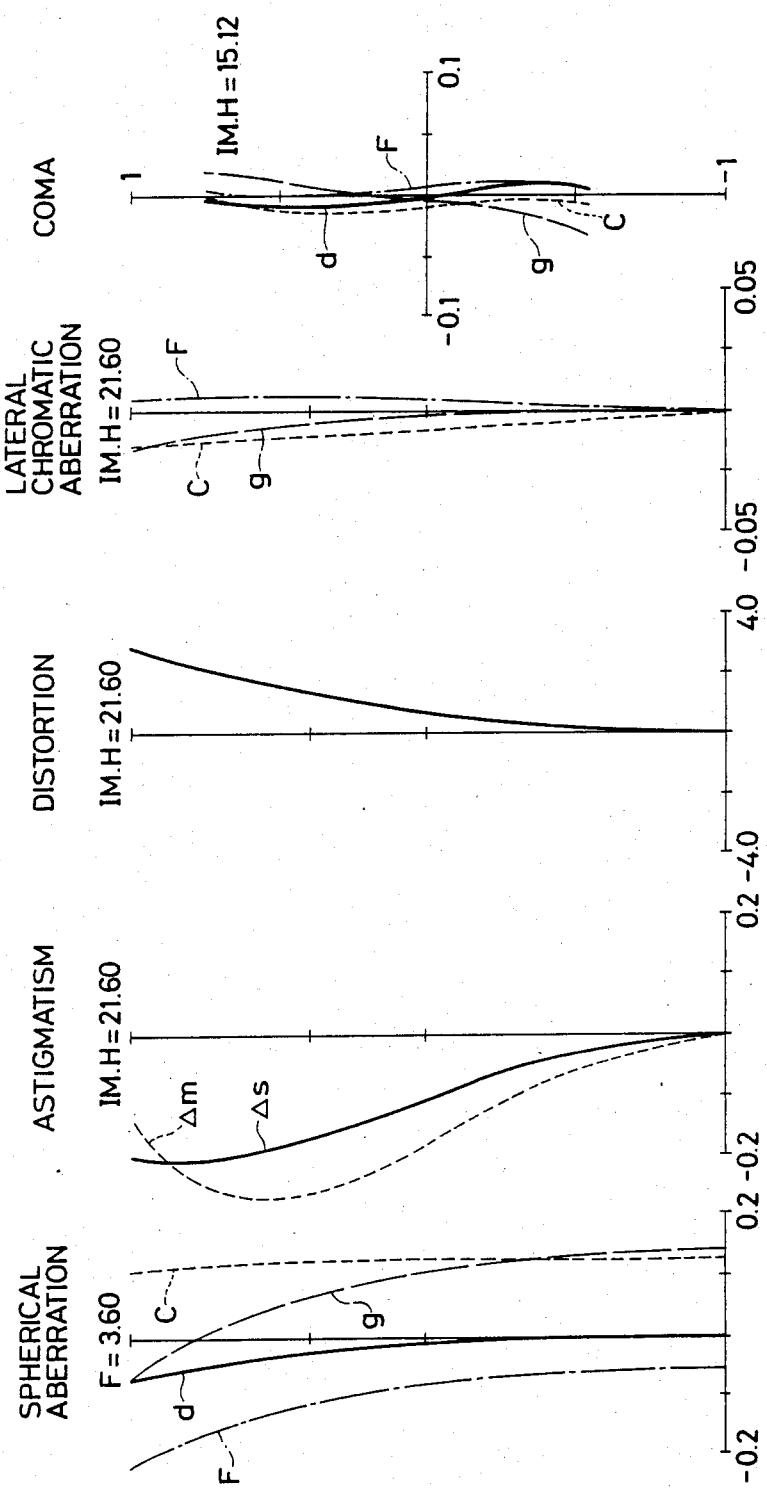

For respective embodiments shown in the above, values of variable airspaces $d_5$, $d_{10}$ and $d_{13}$ in the wide position and teleposition at the time of zooming are as given in the numerical data shown in the above. Values of $d_5$ given in parentheses show the values when the zoom lens system is focused by moving the first lens group I (magnification 1/50). Aberration curves of said embodiments are shown in FIGS. 2 through 21. Out of them, FIGS. 2 through 5 respectively show aberration curves of Embodiment 1. Among them, FIGS. 2 and 3 respectively show aberration curves in the wide position and teleposition when Embodiment 1 is focused on an object at the infinite distance. FIGS. 4 and 5 respectively show abberration curves in the wide position and teleposition when Embodiment 1 is focused so that the magnification becomes 1/50. FIGS. 6 through 9 respectively show abberration curves of Embodiment 2. FIGS. 6 and 7 respectively show aberration curves in the wide position and teleposition when Embodiment 2 is focused on an object at the infinite distance while FIGS. 8 and 9 respectively show aberration curves in the wide position and teleposition when Embodiment 2 is focused so that the magnification becomes 1/50. FIGS. 10 through 13 respectively show aberration curves of Embodiment 3. FIGS. 10 and 11 respectively show aberration curves in the wide position and teleposition when Embodiment 3 is focused on an object at the infinite distance while FIGS. 12 and 13 respectivey show aberration curves in the wide position and teleposition when Embodiment 3 is focused so that the magnification becomes 1/50. FIGS. 14 through 17 respectively show aberration curves of Embodiment 4. FIGS. 14 and 15 respectively show aberration curves in the wide position and teleposition when Embodiment 4 is focused on an object at the infinite distance while FIGS. 16 and 17 respectively show aberration curves in the wide position and teleposition when Embodiment 4 is focused so that the magnification becomes 1/50. FIGS. 18 through 21 respectively show aberration curves of Embodiment 5. FIGS. 18 and 19 respectively show aberration curves when Embodiment 5 is focused on an object at the infinite distance while FIGS. 20 and 21 respectively show aberration curves when Embodiment 5 is focused so that the magnification becomes 1/50.

I claim:

1. A zoom lens system comprising a varifocal system and a relay lens, said varifocal system comprising a first, second and third lens groups in the order from the object side, said first lens group being a focusing lens group having a positive length, said second lens group being a variator having a negative focal length, said third lens group being a compensator having a positive focal length, said relay lens consisting of a positive single lens, a negative single lens, a positive lens located by leaving a comparatively large airspace in respect to said negative single lens, and a negative meniscus lens concave toward the object side, said zoom lens system fulfilling the conditions (1) through (7) shown below:

$$0.8 < \phi_{9,10}/\phi_R < 1.6 \qquad (1)$$

$$1.0 < |\phi_{12}|\phi_R < 2.5 \qquad (2)$$

$$1.3 < \phi_R/\phi < 2.2 \qquad (3)$$

$$0.15 < d_{18} \cdot \phi_R < 0.35 \quad (4)$$

$$0.03 < d_{20} \cdot \phi_R < 0.10 \quad (5)$$

$$0.25 < n_{10} - n_9 < 0.45 \quad (6)$$

$$25 < \nu_9 - \nu_{10} < 40 \quad (7)$$

where, reference symbol $\phi_{9,10}$ represents the total refractive power of the positive and negative lens located on the object side in the fourth lens group, reference symbol $\phi_{12}$ represents the refractive power of the negative lens located on the image side in the fourth lens group, reference symbol $d_{18}$ represents the airspace between the negative lens on the object side and positive lens on the image side in the fourth lens group, reference symbol $d_{20}$ represents the airspace between the positive lens on the image side and negative lens on the image side in the fourth lens group, reference symbols $n_9$ and $n_{10}$ respectively represent refractive indices of the positive lens on the object side and negative lens on the object side in the fourth lens group, reference symbols $\nu_9$ and $\nu_{10}$ respectively represents Abbe's numbers of the positive lens on the object side and negative lens on the object side in the fourth lens, reference symbol $\phi_R$ represents the refractive power of the fourth lens group, and reference symbol $\phi$ represents the refractive power of the zoom lens system as a whole in the teleposition.

2. A zoom lens system according to claim 1, in which said first lens group comprises a positive cemented doublet consisting of a positive lens and a negative lens cemented together and a positive single lens in the order from the object side, said second lens group comprises a negative cemented doublet consisting of a positive lens and a negative lens cemented together and a negative single lens in the order from the object side, and said third lens group comprises a positive cemented doublet consisting of a positive lens and a negative lens cemented together.

3. A zoom lens system according to claim 2 further fulfilling the conditions (8) through (11) shown below:

$$0.54 < r_1 \cdot \phi < 0.9 \quad (8)$$

$$0.05 < n_2 - n_1 < 0.25 \quad (9)$$

$$1.45 < n_3 < 1.60 \quad (10)$$

$$0.2 < n_4 - n_5 < 0.45 \quad (11)$$

where, reference symbol $r_1$ represents the radius of curvature of the surface on the object side of the cemented doublet constituting the first lens group, reference symbols $n_1$ and $n_2$ respectively represent refractive indices of the two lens elements constituting the cemented doublet in the first lens group, reference symbol $n_3$ represents the refractive index of the positive single lens in the first lens group, and reference symbols $n_4$ and $n_5$ resepectively represent refractive indices of the two lens elements constituting the cemented doublet in the second lens group.

4. A zoom lens system according to claim 3, in which said zoom lens system has the following numerical data:

$r_1 = 114.4266$
$d_1 = 6.5000$    $n_1 = 1.62041$    $\nu_1 = 60.27$
$r_2 = -144.0061$
$d_2 = 2.5000$    $n_2 = 1.80518$    $\nu_2 = 25.43$
$r_3 = -503.9910$
$d_3 = 0.2000$
$r_4 = 143.0552$
$d_4 = 4.0000$    $n_3 = 1.48749$    $\nu_3 = 70.15$
$r_5 = -1820.1154$
$d_5$ (variable)
$r_6 = 131.4978$
$d_6 = 4.0000$    $n_4 = 1.80518$    $\nu_4 = 25.43$
$r_7 = -45.0313$
$d_7 = 1.7000$    $n_5 = 1.48749$    $\nu_5 = 70.15$
$r_8 = 55.4949$
$d_8 = 4.0000$
$r_9 = -44.4590$
$d_9 = 1.4000$    $n_6 = 1.56873$    $\nu_6 = 63.16$
$r_{10} = 145.6729$
$d_{10}$ (variable)
$r_{11} = 156.1381$
$d_{11} = 6.5000$    $n_7 = 1.57250$    $\nu_7 = 57.76$
$r_{12} = -26.4575$
$d_{12} = 2.0000$    $n_8 = 1.71736$    $\nu_8 = 29.51$
$r_{13} = -61.9129$
$d_{13}$ (variable)
$r_{14} = \infty$ (stop)
$d_{14} = 1.5000$
$r_{15} = 25.2207$
$d_{15} = 5.9000$    $n_9 = 1.48749$    $\nu_9 = 70.15$
$r_{16} = 4203.7771$
$d_{16} = 1.5512$
$r_{17} = -626.0682$
$d_{17} = 2.1369$    $n_{10} = 1.83400$    $\nu_{10} = 37.16$
$r_{18} = 135.8456$
$d_{18} = 21.918$
$r_{19} = 77.2753$
$d_{19} = 3.2000$    $n_{11} = 1.65016$    $\nu_{11} = 39.39$
$r_{20} = -149.1128$
$d_{20} = 5.0000$
$r_{21} = -20.9916$
$d_{21} = 1.9866$    $n_{12} = 1.77250$    $\nu_{12} = 49.66$
$r_{22} = -45.9368$
$f = 76.0 \sim 146.0, F/3.6$

|  | $d_5$ | $d_{10}$ | $d_{13}$ |
|---|---|---|---|
| wide position | 2.202 (5.621) | 24.862 | 8.787 |
| teleposition | 30.288 (31.974) | 0.603 | 4.959 |

$1/\phi_R = 92.383$, $1/\phi_{9,10} = 78.895$, $1/\phi_{12} = -51.840$ where, reference symbols $r_1$ through $r_{22}$ respectively represent radii of curvature of respective lens surfaces, reference symbols $d_1$ through $d_{21}$ respectively represent thicknesses of respective lenses and airspaces between respective lenses, reference symbols $n_1$ through $n_{12}$ respectively represent refractive indices of respective lenses, and reference symbols $\nu_1$ through $\nu_{12}$ respectively represent Abbe's numbers of respective lenses.

5. A zoom lens system according to claim 3, in which said zoom lens system has the following numerical data:

$r_1 = 114.6273$
$d_1 = 6.5000$    $n_1 = 1.61700$    $\nu_1 = 62.79$
$r_2 = -123.3064$
$d_2 = 2.5000$    $n_2 = 1.80518$    $\nu_2 = 25.43$
$r_3 = -742.6218$
$d_3 = 0.2000$
$r_4 = 113.2170$
$d_4 = 4.0000$    $n_3 = 1.48749$    $\nu_3 = 70.15$
$r_5 = -1444.3487$
$d_5$ (variable)
$r_6 = -144.9817$
$d_6 = 4.0000$    $n_4 = 1.80518$    $\nu_4 = 25.43$
$r_7 = -43.5873$
$d_7 = 1.7000$    $n_5 = 1.48749$    $\nu_5 = 70.15$ -continued

```
r8 = 49.7389
d8 = 4.4000
r9 = -40.8422
d9 = 1.4000      n6 = 1.61700    v6 = 62.79
r10 = 171.2489
d10 (variable)
r11 = 124.8815
d11 = 6.5000     n7 = 1.51112    v7 = 60.48
r12 = -24.4313
d12 = 2.0000     n8 = 1.69895    v8 = 30.12
r13 = -49.0791
d13 (variable)
r14 = ∞ (stop)
d14 = 1.5000
r15 = 23.7091
d15 = 6.7000     n9 = 1.48749    v9 = 70.15
r16 = -2632.2362
d16 = 0.7000
r17 = 444.5448
d17 = 2.1369     n10 = 1.83400   v10 = 37.16
r18 = 71.7015
d18 = 20.1407
r19 = 70.0214
d19 = 3.2000     n11 = 1.80440   v11 = 39.58
r20 = -543.4698
d20 = 3.7000
r21 = -20.3811
d21 = 2.0000     n12 = 1.77250   v12 = 49.66
r22 = -39.1623
f = 76.0~146.0, F/3.6
```

|  | $d_5$ | $d_{10}$ | $d_{13}$ |
|---|---|---|---|
| wide position | 2.203 (5.270) | 22.119 | 8.859 |
| teleposition | 28.930 (30.443) | 0.900 | 3.352 |
| $1/\phi_R = 90.759$, $1/\phi_{9,10} = 81.152$, $1/\phi_{12} = -57.692$ | | | | where, reference symbols $r_1$ through $r_{22}$ respectively represent radii of curvature of respective lens surfaces, reference symbols $d_1$ through $d_{21}$ respectively represent thicknesses of respective lenses and airspaces between respective lenses, reference symbols $n_1$ through $n_{12}$ respectively represent refractive indices of respective lenses, and reference symbols $v_1$ through $v_{12}$ respectively represent Abbe's numbers of respective lenses.

6. A zoom lens system according to claim 3, in which said zoom lens system has the following numerical data:

```
r1 = 103.8824
d1 = 6.5000      n1 = 1.62041    v1 = 60.27
r2 = -106.7019
d2 = 2.5000      n2 = 1.78472    v2 = 25.71
r3 = -602.4131
d3 = 0.2000
r4 = 191.3289
d4 = 4.0000      n3 = 1.58913    v3 = 60.97
r5 = ∞
d5 (variable)
r6 = -111.4801
d6 = 4.0000      n4 = 1.84666    v4 = 23.88
r7 = -43.1454
d7 = 1.7000      n5 = 1.48749    v5 = 70.15
r8 = 54.7964
d8 = 4.7000
r9 = -41.3299
d9 = 1.4000      n6 = 1.54771    v6 = 62.83
r10 = 141.4656
d10 (variable)
r11 = 118.5101
d11 = 6.5000     n7 = 1.48749    v7 = 70.15
r12 = -27.0792
d12 = 2.0000     n8 = 1.74077    v8 = 27.79
r13 = -48.8340
d13 (variable)
r14 = ∞ (stop)
d14 = 1.5000
r15 = 23.5727
d15 = 6.7000     n9 = 1.48749    v9 = 70.15
r16 = 403.4998
d16 = 0.7000
r17 = 911.4731
d17 = 2.1369     n10 = 1.83400   v10 = 37.16
r18 = 111.1759
d18 = 19.7725
r19 = 60.8755
d19 = 3.2000     n11 = 1.63980   v11 = 34.43
r20 = -328.0102
d20 = 3.7000
r21 = -19.8174
d21 = 2.0000     n12 = 1.83481   v12 = 42.72
r22 = -37.8971
f = 76.0~146.0, F/3.6
```

|  | $d_5$ | $d_{10}$ | $d_{13}$ |
|---|---|---|---|
| wide position | 2.316 (5.929) | 21.452 | 11.069 |
| teleposition | 31.938 (33.718) | 0.630 | 2.269 |
| $1/\phi_R = 86.200$, $1/\phi_{9,10} = 72.045$, $1/\phi_{12} = -52.397$ | | | | where, reference symbols $r_1$ through $r_{22}$ respectively represent radii of curvature of respective lens surfaces, reference symbols $d_1$ through $d_{21}$ respectively represent thicknesses of respective lenses and airspaces between respective lenses, reference symbols $n_1$ through $n_{12}$ respectively represent refractive indices of respective lenses, and reference symbols $v_1$ through $v_{12}$ respectively represent Abbe's numbers of respective lenses.

7. A zoom lens system according to claim 3, in which said zoom lens system has the following numerical data:

```
r1 = 110.8822
d1 = 6.5000      n1 = 1.61700    v1 = 62.79
r2 = -112.4859
d2 = 2.5000      n2 = 1.80518    v2 = 25.43
r3 = -519.9799
d3 = 0.2000
r4 = 119.6558
d4 = 4.0000      n3 = 1.48749    v3 = 70.15
r5 = -1448.6721
d5 (variable)
r6 = -143.9423
d6 = 4.0000      n4 = 1.80518    v4 = 25.43
r7 = -41.9617
d7 = 1.7000      n5 = 1.48749    v5 = 70.15
r8 = 52.6514
d8 = 4.4000
r9 = -40.4673
d9 = 1.4000      n6 = 1.61700    v6 = 62.79
r10 = 134.6846
d10 (variable)
r11 = 123.8962
d11 = 6.5000     n7 = 1.50378    v7 = 66.81
r12 = -25.5701
d12 = 2.0000     n8 = 1.69895    v8 = 30.12
r13 = -51.8687
d13 (variable)
r14 = ∞ (stop)
d14 = 1.5000
r15 = 23.9862
d15 = 6.7000     n9 = 1.48749    v9 = 70.15
r16 = 2509.3471
d16 = 0.7000
r17 = 475.6668
d17 = 2.1369     n10 = 1.83400   v10 = 37.16
r18 = 84.9005
d18 = 20.1619
r19 = 73.9490
d19 = 3.2000     n11 = 1.80440   v11 = 39.58
r20 = -502.5539
d20 = 3.7000
r21 = -20.0936
d21 = 2.0000     n12 = 1.77250   v12 = 49.66
```

-continued $r_{22} = -37.3404$
$f = 76.0 \sim 146.0$, F/3.6

|  | $d_5$ | $d_{10}$ | $d_{13}$ |
|---|---|---|---|
| wide position | 2.217 (5.120) | 22.285 | 8.172 |
| teleposition | 27.662 (29.094) | 0.601 | 4.412 |

$1/\phi_R = 84.207$, $1/\phi_{9,10} = 75.881$, $1/\phi_{12} = -59.314$ where, reference symbols $r_1$ through $r_{22}$ respectively represent radii of curvature of respective lens surfaces, reference symbols $d_1$ through $d_{21}$ respectively represent thicknesses of respective lenses and airspaces between respective lenses, reference symbols $n_1$ through $n_{12}$ respectively represent refractive indices of respective lenses, and reference symbols $\nu_1$ through $\nu_{12}$ respectively represent Abbe's numbers of respective lenses.

8. A zoom lens system according to claim 3, in which said zoom lens system has the following numerical data:

$r_1 = 108.9400$
$d_1 = 6.5000$    $n_1 = 1.62041$    $\nu_1 = 60.27$
$r_2 = -111.2308$
$d_2 = 2.5000$    $n_2 = 1.80518$    $\nu_2 = 25.43$
$r_3 = -599.8178$
$d_3 = 0.2000$
$r_4 = 127.8805$
$d_4 = 4.0000$    $n_3 = 1.48749$    $\nu_3 = 70.15$
$r_5 = -1049.4154$
$d_5$ (variable)
$r_6 = -141.5722$
$d_6 = 4.0000$    $n_4 = 1.84666$    $\nu_4 = 23.88$
$r_7 = -42.5680$
$d_7 = 1.7000$    $n_5 = 1.51633$    $\nu_5 = 64.15$
$r_8 = 57.7618$
$d_8 = 4.4000$
$r_9 = -42.1712$
$d_9 = 1.4000$    $n_6 = 1.62280$    $\nu_6 = 57.06$
$r_{10} = 128.1566$
$d_{10}$ (variable)
$r_{11} = 145.1361$
$d_{11} = 6.5000$    $n_5 = 1.60729$    $\nu_7 = 49.19$
$r_{12} = -26.7115$
$d_{12} = 2.0000$    $n_8 = 1.78470$    $\nu_8 = 26.22$
$r_{13} = -61.1277$
$d_{13}$ (variable)
$r_{14} = \infty$ (stop)
$d_{14} = 1.5000$
$r_{15} = 23.9982$
$d_{15} = 6.7000$    $n_9 = 1.48749$    $\nu_9 = 70.15$
$r_{16} = 832.5575$
$d_{16} = 0.7000$
$r_{17} = 568.4760$
$d_{17} = 2.1369$    $n_{10} = 1.83400$    $\nu_{10} = 37.16$
$r_{18} = 80.9286$
$d_{18} = 19.3710$
$r_{19} = 70.4960$
$d_{19} = 3.2000$    $n_{11} = 1.80440$    $\nu_{11} = 39.58$
$r_{20} = -624.5135$
$d_{20} = 5.1800$
$r_{21} = -20.0501$
$d_{21} = 2.0000$    $n_{12} = 1.77250$    $\nu_{12} = 49.66$
$r_{22} = -36.8514$
$f = 76.049 \sim 145.973$, F/3.6

|  | $d_5$ | $d_{10}$ | $d_{13}$ |
|---|---|---|---|
| wide position | 2.521 (5.545) | 22.465 | 8.451 |
| teleposition | 28.646 (30.139) | 0.763 | 4.027 |

$1/\phi_R = 87.683$, $1/\phi_{9,10} = 82.456$, $1/\phi_{12} = -60.043$ where, reference symbols $r_1$ through $r_{22}$ respectively represent radii of curvature of respective lesn surfaces, reference symbols $d_1$ through $d_{21}$ respectively represent thicknesses of respective lenses and airspaces between respective lenses, reference symbols $n_1$ through $n_{12}$ respectively represent refractive indices of respective lenses, and reference symbols $\nu_1$ through $\nu_{12}$ respectively represent Abbe's numbers of respective lenses.

* * * * *